US012703149B2

(12) United States Patent
Twietmeyer et al.

(10) Patent No.: US 12,703,149 B2
(45) Date of Patent: Aug. 11, 2026

(54) METHODS INCLUDING A COMBINED LIGHT SHEET AND APPARATUSES

(71) Applicant: QUADRATIC 3D, INC., Charlestown, MA (US)

(72) Inventors: Karen Twietmeyer, Belmont, MA (US); Richard Nelson Rose, Cambridge, MA (US)

(73) Assignee: QUADRATIC 3D, INC., Charlestown, MA (US)

( * ) Notice: Subject to any disclaimer, the term of this patent is extended or adjusted under 35 U.S.C. 154(b) by 229 days.

(21) Appl. No.: 18/737,586

(22) Filed: Jun. 7, 2024

(65) Prior Publication Data

US 2024/0316865 A1 Sep. 26, 2024

Related U.S. Application Data

(63) Continuation of application No. PCT/US2022/052157, filed on Dec. 7, 2022.
(Continued)

(51) Int. Cl.
*B29C 64/264* (2017.01)
*B29C 64/124* (2017.01)
(Continued)

(52) U.S. Cl.
CPC .......... *B29C 64/264* (2017.08); *B29C 64/124* (2017.08); *B33Y 10/00* (2014.12);
(Continued)

(58) Field of Classification Search
CPC ... B29C 64/124; B29C 64/129; B29C 64/135; B29C 64/264; B29C 64/268;
(Continued)

(56) References Cited

U.S. PATENT DOCUMENTS 4,041,476 A 8/1977 Swainson
4,078,229 A 3/1978 Swainson et al.
(Continued)

FOREIGN PATENT DOCUMENTS

CN 11880299 A 11/2020
CN 113059807 A * 7/2021 ............. B29C 64/10
(Continued)

OTHER PUBLICATIONS

Regehly, M., Garmshausen, Y., Reuter, M. et al. Xolography for linear volumetric 3D printing. Nature 588, 620-624 (2020), accessed at https://doi.org/10.1038/s41586-020-3029-7 on Mar. 13, 2026. (Year: 2020).*
(Continued)

*Primary Examiner* — JaMel M Nelson

(57) ABSTRACT

The present invention relates to the technical field of light sheet technology and related methods and apparatuses including light sheet technology for use in three-dimensional printing. The present invention includes methods and apparatuses including a combined light sheet including, for example, methods for improving light intensity uniformity of a light sheet including a first wavelength passing through a composition and methods of forming an object in a volume, which methods include a combined light sheet comprising a generated light sheet and reflected light sheet, and related apparatuses.

29 Claims, 19 Drawing Sheets

Related U.S. Application Data

(60) Provisional application No. 63/400,288, filed on Aug. 23, 2022, provisional application No. 63/287,508, filed on Dec. 8, 2021, provisional application No. 63/287,510, filed on Dec. 8, 2021.

(51) Int. Cl.

| | |
|---|---|
| ***B33Y 10/00*** | (2015.01) |
| ***B33Y 30/00*** | (2015.01) |
| ***G02B 17/08*** | (2006.01) |
| ***G02B 19/00*** | (2006.01) |

(52) U.S. Cl.
CPC .............. *B33Y 30/00* (2014.12); *G02B 17/08* (2013.01); *G02B 19/0023* (2013.01)

(58) Field of Classification Search
CPC ... B29C 64/273; B29C 64/277; B29C 64/282; B29C 64/286; B29C 64/291; B33Y 10/00; B33Y 30/00; B33Y 50/02; G02B 5/08; G02B 17/08; G02B 19/0023
See application file for complete search history.

(56) References Cited

U.S. PATENT DOCUMENTS

| | | | | |
|---|---|---|---|---|
| 4,238,840 | A | 12/1980 | Swainson | |
| 4,288,861 | A | 9/1981 | Swainson et al. | |
| 4,333,165 | A | 6/1982 | Swainson et al. | |
| 4,466,080 | A | 8/1984 | Swainson et al. | |
| 4,471,470 | A | 9/1984 | Swainson et al. | |
| 5,230,986 | A | 7/1993 | Neckers | |
| 7,166,409 | B2 | 1/2007 | Fleming et al. | |
| 10,843,410 | B2 | 11/2020 | Lippert et al. | |
| 10,967,578 | B2 | 4/2021 | Clark | |
| 2006/0033935 | A1 | 2/2006 | Keightley et al. | |
| 2007/0108644 | A1 | 5/2007 | Cregger | |
| 2018/0015672 | A1* | 1/2018 | Shusteff | B29C 64/264 |
| 2018/0326666 | A1 | 11/2018 | Kelly et al. | |
| 2018/0333911 | A1 | 11/2018 | Lin et al. | |
| 2019/0010463 | A1 | 1/2019 | Matheu et al. | |
| 2020/0361152 | A1 | 11/2020 | Shusteff et al. | |
| 2021/0325651 | A1 | 10/2021 | Tsia et al. | |
| 2022/0305723 | A1 | 9/2022 | Garmshausen et al. | |
| 2022/0410473 | A1 | 12/2022 | Garmshausen et al. | |
| 2023/0094821 | A1 | 3/2023 | Twietmeyer et al. | |
| 2024/0166912 | A1 | 5/2024 | Sanders et al. | |
| 2024/0208111 | A1 | 6/2024 | Twietmeyer | |

FOREIGN PATENT DOCUMENTS

| | | | | |
|---|---|---|---|---|
| CN | 113059807 | B | 7/2021 | |
| WO | WO 2019/194798 | A1 | 10/2019 | |
| WO | WO-2020245456 | A1 * | 12/2020 | C08F 222/104 |
| WO | WO 2021/089090 | A1 | 5/2021 | |
| WO | WO 2021/154895 | A1 | 8/2021 | |
| WO | WO 2021/154897 | A1 | 8/2021 | |
| WO | WO 2021/247926 | A1 | 12/2021 | |
| WO | WO 2023/107573 | A1 | 6/2023 | |

OTHER PUBLICATIONS

Bao, Y., "Recent Trends in Advanced Photoinitiators for Vat Photopolymerization 3D printing", Macromol. Rapid Commun. 2022, 43, 2200202.

Buckley, S., "Advances in the applications of Lasers for Bioimaging: Light Sheet Microscopy", Spectroscopy, Spectroscopy-Oct. 1, 2019, vol. 34, Issue 10, pp. 30-32, 50.

Hahn, V., et al., "3-D Laser Printing", Optics & Photonics News, pp. 30-36 Oct. 2019.

Ichimura, K., et al., A Spiropyran-Iodonium Salt System as a Two Photon Radical Photoinitiator, J Polym. Sci: Part C: Polymer Letters, vol. 26, 185-189 (1988).

International Search Report and Written Opinion mailed in PCT/US22/52157 mailed Mar. 28, 2023 (Parent Application).

Jeudy, R., et al., "Spectral Photosensitization of a Variable Index Material for Recording Phase Holograms with High Efficiency", Opt. Commun. 1975, vol. 13, No. 1, pp. 25-28.

Jiang, Z., et al., "Extrusion 3D Printing of Polymeric Materials with Advanced Properties", Adv. Sci. 2020, 7, 2001379 (32 pages).

Lee, S-K., et al., "Benzospiropyrans as Photochromic and/or Thermochromic Photoinitiators", Chem. Mater. 1991, 3, pp. 852-858.

Lee, S-K., et al., "Two-photon radical photoinitiator system based on iodinated benzospiropyrans",Chem. Mater. 1991, 3, pp. 858-864.

Lee, Y-H, et al., "Fabrication of Periodic 3D Nanostructuration for Optical Surfaces by Holographic Two-Photon-Polymerization", Int'l Journal of Information and Electronics Engineering, vol. 6, No. 3, May 2016.

Liravi, F., et al., "Additive manufacturing of 3D structures with non-Newtonian highly viscous fluids: Finite element modeling and experimental validation", Additive Manufacturing (2016), http://dx.doi.org/10.1016/j.addma.2016.10.008.

Loterie, D., et al., "High-resolution tomographic volumetric additive manufacturing", Nature Communications (2020) 11:852 | https://doi.org/10.1038/s41467-020-14630-4 | www.nature.com/naturecommunications.

Lu, P., et al., "Wavelength-selective light-matter interactions in polymer science", Matter 4, 2172-2229, Jul. 7, 2021.

Reghely, M., et al., "Xolography for linear volumetric 3D printing ", Nature vol. 588 Dec. 24-31, 2020.

Reghely, M., et al., Supplementary Information—"Xolography for linear volumetric 3D printing", NatureResearch 2020.

Schwerzel, R.E., et al., AD-A134 711, "Three Dimensional Photochemical Machining with Lasers", Battelle Columbus Labs OH, 28 Dec 84 AFOSR-TR-85-0456 F49620-82-C-0077.

Texas Instruments "DLP6500 0.65 1018p MVSP Type A DMD", DLP6500, DLPS040A—Oct. 2014—Revised Oct. 2016.

Wang, B., et al., Nature Communications (2022) 13:367 (https://doi.org/10.1038/s41467-022-28013-4).

Yang, X, et al. "Microscopy: looking into the mirror", Light & Applictions (2018)7:4.

* cited by examiner 6
3
1
2
y
6
x
z
y (height)
x (depth)
z (width)

Decreasing light sheet intensity
1
4
6
2
xy view
y
x 2
y
z
1
At Edges of container
yz view 1
2
y
z
At Center of container
yz view Decreasing light sheet intensity
1
6
2
xz view
z
x 6
3
1
2
5
Projection
y
6
x
z
y (height)
x (depth)
z (width)

Decreasing light sheet intensity
1
7
4
6
2
xy view
y y
z
5
7
1
2
At Edges of container
yz view Decreasing light sheet intensity
1
6
7
5
7
xz view
z
x
2
1
5
7
y
z
At Center of container
yz view

FIG. 13

134
133
131
132
136
137
x
y 165
166
163
164
RCP
LCP
162
QWP
VLP
HLP
168
161
160
161
168
VLP
HLP
169
VLP
x
y

METHODS INCLUDING A COMBINED LIGHT SHEET AND APPARATUSES

CROSS-REFERENCE TO RELATED APPLICATIONS

This application is a continuation of International Application No. PCT/US2022/052157, filed 7 Dec. 2022, which International Application claims priority to U.S. Provisional Patent Application No. 63/287,510 filed 8 Dec. 2021, U.S. Provisional Patent Application No. 63/400,288 filed 23 Aug. 2022, and U.S. Provisional Patent Application No. 63/287,508 filed 8 Dec. 2021, each of which applications is hereby incorporated herein by reference in its entirety for all purposes.

TECHNICAL FIELD OF THE INVENTION

The present invention relates to the technical field of light sheet technology and related methods and apparatuses including light sheet technology for use in three-dimensional printing.

BRIEF SUMMARY OF THE INVENTION

The present invention includes methods and apparatuses including a combined light sheet.

In accordance with one aspect of the present invention there is provided a method of forming an object in a volume of a composition comprising a photohardenable composition, the method comprising:

(a) forming a combined light sheet including a first wavelength at a selected location in the volume of the composition comprising the photohardenable composition, the combined light sheet comprising a generated light sheet and a reflected light sheet, (b) projecting an optical image including a second wavelength into the volume of the composition to intersect with the combined light sheet at the selected location in the volume, the optical image being projected into the volume along a projection axis perpendicular to a major face of the combined light sheet, the projected optical image being perpendicular to its projection axis, wherein the composition comprising the photohardenable composition is at least partially hardened at the intersection of the optical image and the combined light sheet; and (c) optionally repeating steps (a) and (b) until the object is partially or fully formed, wherein the intersection occurs at the same or a different selected location in the volume.

In accordance with another aspect of the present invention there is provided a method of forming an object in a volume of a composition comprising a photohardenable composition, the method comprising:

(a) forming a combined light sheet including a first wavelength at a selected location in the volume of the composition comprising the photohardenable composition comprising directing a generated light sheet along a light sheet illumination axis at the selected location through the volume of the composition and reflecting the light sheet exiting the volume of the composition back through the volume of the photohardenable composition, preferably along or substantially along the light sheet illumination axis, to form the combined light sheet, (b) projecting an optical image including a second wavelength into the volume of the composition to intersect with the combined light sheet at the selected location in the volume, the optical image being projected into the volume along a projection axis perpendicular to the light sheet illumination axis, the projected optical image being perpendicular to its projection axis and the combined sheet being orthogonal to the direction in which the optical image is projected into the volume, wherein the composition comprising the photohardenable composition is at least partially hardened at the intersection of the optical image and the combined light sheet; and (c) optionally repeating steps (a) and (b) until the object is partially or fully formed, wherein, for a set of the repeated steps, the intersection occurs at the same or a different selected location in the volume.

In accordance with another aspect of the present invention, there is provided an apparatus for forming an object in a volume of a composition comprising a photohardenable composition, the apparatus comprising:

a workspace configured to include a volume of the composition comprising the photohardenable composition, wherein the volume is optically accessible;

a light sheet generating system for generating and/or directing a light sheet including first wavelength light through the volume of the composition included in the workspace along a light sheet illumination axis at a selected location in the volume; and reflection optics comprising a reflective optical element including a reflecting surface, the reflection optics being positioned and configured to reflect the generated light sheet exiting the volume of the composition included in the workspace back through the volume of the composition, preferably along or substantially along the light sheet illumination axis, and an optical image projection system for projecting an optical image including second wavelength light into the volume of the composition, wherein the light sheet generating system, reflection optics and optical image generating system are configurable for the optical image to intersect with the combined light sheet at the selected location in the volume with the optical image being projected into the volume along a projection axis perpendicular to the light sheet optical illumination axis.

Reflection optics can optionally further include one or more optical elements, e.g., lenses, in addition to a reflective optical element including a reflecting surface.

The apparatus can further include a controller configured to selectively operate at least one, and preferably all, of the light sheet generating system, reflection optics, and optical image projection system so that the combined light sheet and optical image intersect at one or more selected locations in the volume of the composition.

In accordance with another aspect of the present invention, there is provided a printer including an apparatus of the present invention.

In accordance with another aspect of the present invention there is provided a method for improving light intensity uniformity of a light sheet including a first wavelength passing through a volume of a composition which has nonzero absorption for the first wavelength, the method comprising:

directing the light sheet including the first wavelength along a light sheet illumination axis at a selected location through the volume of the composition; and reflecting the light sheet exiting the volume of the composition back through the volume of the composition, preferably along or substantially along the light sheet illumination axis, wherein the reflected light sheet at least partially compensates for attenuation of light intensity of the generated light sheet when it passes through the volume of the composition.

In accordance with another aspect of the present invention, there is provided an apparatus for use in improving light intensity uniformity of a light sheet including a first wavelength passing through a volume of a composition which has nonzero absorption for the first wavelength, the apparatus comprising:

a workspace configured to include a volume of a composition, wherein the volume is optically accessible;

a light sheet generating system for generating and/or directing a light sheet including the first wavelength light through the volume of the composition included in the workspace along a light sheet illumination axis at a selected location in the volume; and reflection optics comprising a reflective optical element including a reflecting surface, the reflection optics being positioned and configured to reflect the generated light sheet exiting the volume of the composition included in the workspace back through the volume of the composition, preferably along or substantially along the light sheet illumination axis, wherein the reflected light sheet at least partially compensates for attenuation of light intensity of the generated light sheet when it passes through the volume of the composition.

Reflection optics can optionally further include one or more optical elements, e.g., lenses, in addition to a reflective optical element including a reflecting surface.

As used herein, the term composition includes photohardenable compositions.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

The foregoing, and other aspects and embodiments described herein and contemplated by this disclosure all constitute embodiments of the present invention.

It is to be understood that both the foregoing general description and the following detailed description are exemplary and explanatory only and are not restrictive of the invention as claimed.

Other embodiments will be apparent to those skilled in the art from consideration of the description, from the claims, and from practice of the invention disclosed herein.

BRIEF DESCRIPTION OF THE DRAWINGS

In the drawings,

FIG. 13 depicts a diagram of a side view of an arrangement including a light sheet generating system, a workspace including a volume of a composition, a quarter wave plate, and reflection optics suitable for inclusion in an embodiment of the present invention.

The attached figures are simplified representations presented for purposes of illustration only; the actual structures may differ in numerous respects, particularly including the relative scale of the articles depicted and aspects thereof.

For a better understanding to the present invention, together with other advantages and capabilities thereof, reference is made to the following disclosure and appended claims in connection with the above-described drawings.

DETAILED DESCRIPTION OF THE INVENTION

Various aspects and embodiments of the present inventions will be further described in the following detailed description.

The present invention includes methods and apparatuses including a combined light sheet including, for example, methods and apparatuses for improving light intensity uniformity of a light sheet passing through a composition and methods and for volumetric printing including a combined light sheet and related apparatuses.

Figures 1A, 1B, 1C, 1D, 1E:
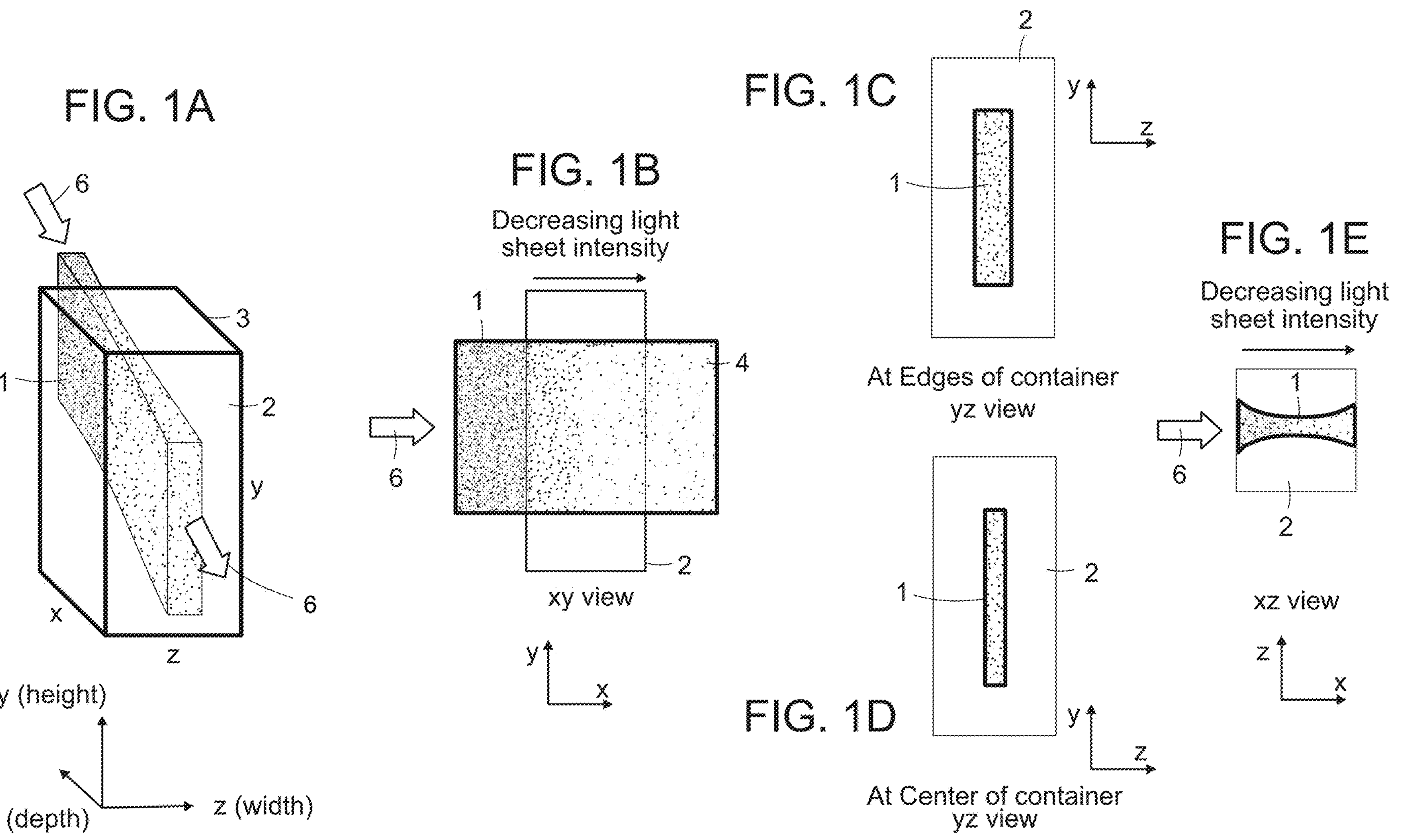
FIGS. 1A-1E illustrate different views of a problem addressed by the present invention.

FIGS. 1A-1E schematically illustrate an example of attenuation of light uniformity that occurs when a light sheet 1 including a first wavelength is directed through a composition 2 which has nonzero absorption for the first wavelength. FIG. 1A schematically illustrates an example of a static planar light sheet including a first wavelength entering a container 3 including a composition which has nonzero absorption for the first wavelength from one side of the container 3, passing through the volume, and exiting the opposite side of the volume. In the depicted example, the light sheet passes through the volume of the composition 2 included in the container 3 in direction as indicated by arrow 6 (depicted as the x-direction). FIG. 1B illustrates a side view (depicted as the xy view) of the light sheet 1 passing through the volume of the composition 2 included in the container and shows a decrease in light intensity as the light sheet passes through the composition 2 along the light sheet illumination axis 6, due at least in part to light absorption by the composition, with the intensity of the exiting light sheet

4 being less than the intensity of the light sheet entering the volume (represented as lighter shading of the light sheet at the exit side of the volume). Light intensity attenuation also occurs with scanned light sheets. FIG. 1C depicts the relative width of the light sheet (the z dimension of the light sheet) where it enters and exits the volume of the composition 2 at the edges of the container, with FIG. 1D depicting the relative width of the light sheet at a cross-section of the light sheet in the yz plane at the center of the volume. FIGS. 1C and 1D illustrate that a light sheet is typically wider at the entry and exit ends in the volume and narrower in the center. (The narrower center is generally referred to in light sheet parlance as a "waist".) FIG. 1E depicts a top view of light sheet 1 (shown in the depicted example as xz view) as it passes through the volume of the composition 2 and shows the decreasing light sheet intensity as it passes through the volume (by decreasing shading at the exiting side of the volume) due at least in part to light absorption by the composition. While the example shown in FIGS. 1A-1E depicts a composition including a liquid medium, the material through which the light sheet passes could alternatively comprise a solid or semi-solid material with light-absorptive properties.

Figures 2A, 2B, 2C, 2D, 2E:
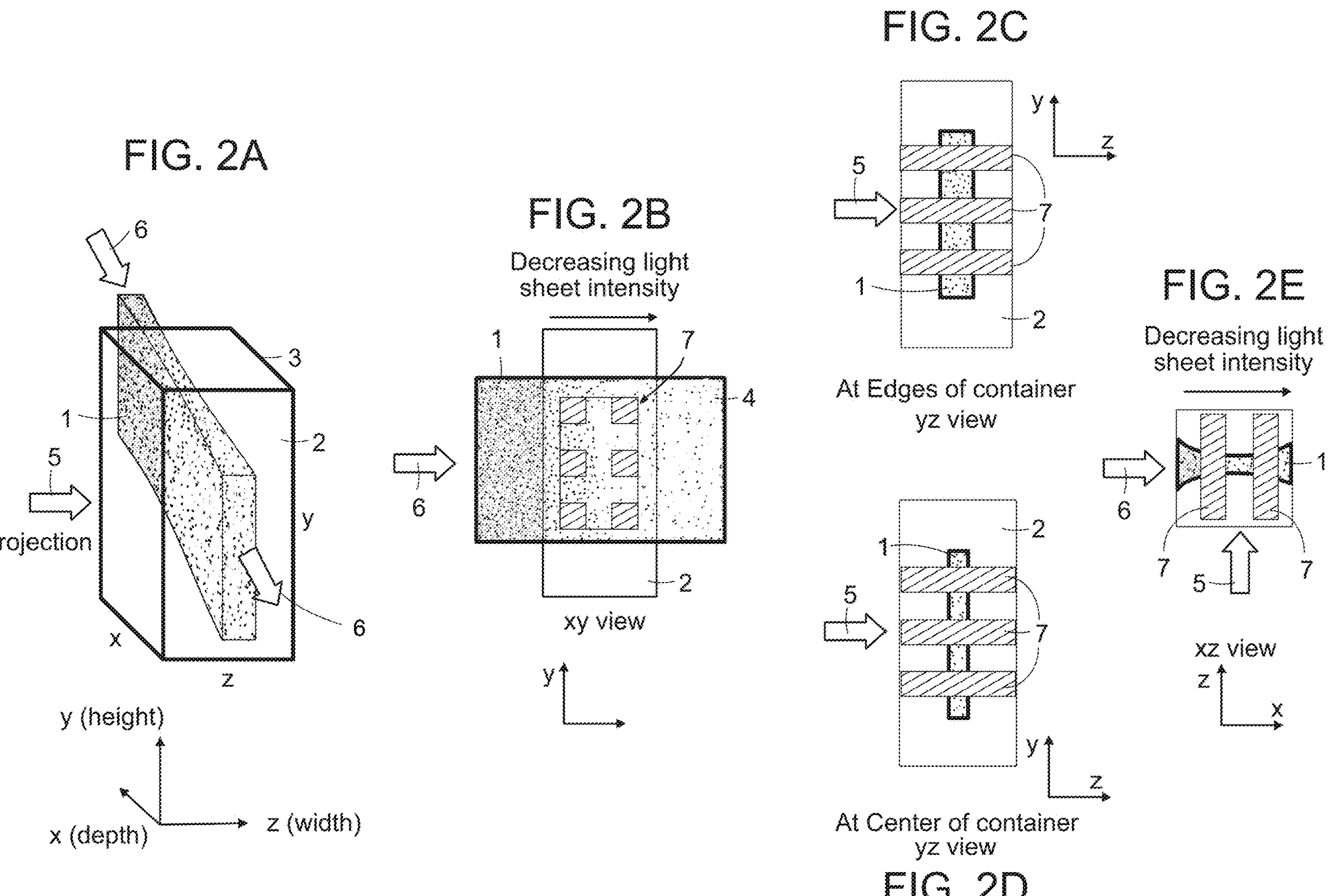
FIGS. 2A-2E illustrate different views of a problem addressed by the present invention in three-dimensional printing.

FIGS. 2A-2E schematically illustrate an example of attenuation of light uniformity that occurs in a volumetric three-dimensional printing method including a light sheet 1 including a first wavelength directed through a volume including a composition comprising a photohardenable composition 2 which has nonzero absorption for the first wavelength. In the depicted example, the volume of the photohardenable composition is included in a container. FIG. 2A schematically illustrates an example of a static planar light sheet entering a volume of the photohardenable composition (typically included in a container 3) from one side of the volume, passing through the volume, and exiting the opposite side of the volume. As depicted, the light sheet passes through the volume of the composition 2 along the light sheet illumination axis 6 (depicted as the x-direction). The direction 5 of a projection of an optical image is shown as projecting into the volume along a projection axis orthogonal to the light sheet projection axis. FIG. 2B illustrates a side view (depicted as the xy view) of the light sheet 1 passing through the volume 2 along the light sheet illumination axis 6 and shows a decrease in light intensity as the light sheet passes through the volume with the intensity of the exiting light sheet 4 being less than the intensity of the light sheet entering the volume (represented as lighter shading of the light sheet at the exit side of the volume) due at least in part to light absorption by the composition. Light intensity attenuation also occurs with scanned light sheets. A projected optical image (shown as a patterned image) 7 is also shown, with the light sheet and optical image intersecting in a coplanar manner. FIG. 2C depicts the relative width of the light sheet as the z dimension of the light sheet where it enters and exits the volume at the edges of the container, with FIG. 2D depicting the relative width of the light sheet at a cross-section of the light sheet in the yz plane at the center of the volume. The depicted (yz) profile also depicts the projection of the optical image 7 into the volume along the optical image projection axis 5 and intersecting with the light sheet 1. FIGS. 2C and 2D illustrate that a light sheet is typically wider at the entry and exit ends in the volume and narrower in the center. (The narrower center is generally referred to in light sheet parlance as a "waist".) FIG. 2E depicts a top view of light sheet 1 (shown in the depicted example as an xz view) as it passes through the volume 2 and shows the decreasing light sheet intensity as it passes through the volume (by decreasing shading at the exiting side of the volume). FIGS. 2C-2E also show the projection axis 5 for projection of the optical image 7 and path of the optical image through the volume of the composition 2.

In accordance with the present invention, improved uniformity of the light intensity of a light sheet including a given wavelength passing through a composition with nonzero absorption for that wavelength can be obtained by reflecting the incident light sheet passing through the composition back therethrough. This can provide higher overall intensity (for example, 60-80% higher) in a composition, such as, for example, a photohardenable composition, resin, or other composition with nonzero absorption for the given wavelength, as compared to a method including a single pass of a single light sheet therethrough. Such improved uniformity can be advantageous in methods and apparatuses that include a light sheet. Such improved uniformity can be particularly advantageous in methods and apparatuses for forming an object in a volume of a composition comprising a photohardenable composition. For example, in methods and apparatuses for forming an object in a volume of a photohardenable composition, such improvement advantageously can facilitate obtaining improved resolution of features of objects formed in the volume. Such improved uniformity can also enlarge the portion of the volume in which an object can be formed.

In accordance with one aspect of the present invention there is provided a method for improving light intensity uniformity of a light sheet including a first wavelength passing through a volume of a composition which has nonzero absorption for the first wavelength, the method comprising:

- directing the light sheet including the first wavelength along a light sheet illumination axis at a selected location through the volume of the composition; and
- reflecting the light sheet exiting the volume of the composition back through the volume of the composition, preferably along or substantially along the light sheet illumination
- wherein the reflected light sheet at least partially compensates for attenuation of light intensity of the generated light sheet when it passes through the volume of the composition.

The method can further include generating the light sheet. Generating a light sheet can comprise, for example, but not limited to, generating a light beam including coherent or incoherent light and using a line generation method such as a cylinder lens, Powell lens, or scanner. Other alternative techniques for generating a light sheet, as discussed below, can be used.

Preferably the reflected light sheet passing back through the volume of the composition overlaps the generated light sheet in the volume.

The step of reflecting the light sheet in a method in accordance with the invention can comprise reflecting the light sheet with reflection optics including a reflective optical element such as, for example, a mirror. Reflection optics can further include one or more lenses and/or other optical elements.

Reflection optics useful in the present method can include a reflective optical element comprising a reflecting surface and can optionally further include one or more lenses and/or other optical elements. Reflection optics can optionally include a zoom optical system, the zoom optical system being positioned between the volume of the composition and the reflective optical element.

More preferably the reflected light sheet is reflected back through the volume along the same illumination axis as that of the incident light sheet (e.g., as generated and directed through the volume) in its initial pass through the volume. Most preferably the generated light sheet is reflected such that the reflected light sheet rays retrace or substantially retrace the path of the generated light sheet rays. The combination of the incident light sheet and the reflected light sheet passing through the volume along the incident light sheet illumination axis can increase uniformity of light sheet intensity along the incident light sheet illumination axis through the volume. Preferably the incident light sheet and the reflected light sheet are coplanar.

The combination of the generated and reflected light sheets can advantageously improve uniformity of light sheet intensity along the light sheet illumination axis through the volume of composition.

The height of the light sheet may be constant or variable as the light sheet passes through the volume of the composition included in the container. For example, it may be desirable for the height of the light sheet to decrease uniformly (compress) as the light passes through the volume, so that the resulting increase in power density (power per arca) compensates for absorption of the light sheet within the composition. Independently, the width of the light sheet may be constant or variable as the light sheet passes through the volume of the composition. For example, it may be desirable for the light sheet to be focused with the focal point in the center of the volume included in the container (i.e., light sheet width is smallest at the center of the volume included in the container and increases towards sides or edges of the volume in the container) to maintain the width below a desired maximum value over the width of the volume in the container, such as a width that is less than 100 um. The choice of reflection optics useful in the present method is determined taking into consideration the height profile and independently on the width profile of the generated light sheet and is preferentially selected such that the reflected light sheet rays retrace or substantially retrace the path of the generated light sheet rays.

One example of reflection optics useful in the present method for reflecting the light sheet can comprise a reflective optical element comprising a reflecting surface, such as, for example, a mirror. Examples of mirrors include mirrors include a flat reflecting surface and mirrors including a curved reflecting surface.

Reflection optics including a reflective optical element may further include one or more optical elements, e.g., lenses.

Such one or more optical elements can include an xz cylinder lens, preferably a positive cylinder lens, where "x" is defined to be in the direction of the light sheet illumination axis and "z" is defined to be in the direction of the light sheet width. More preferably such positive cylinder lens comprises a positive cylinder lens with its curvature along the width (z) axis. The xz cylinder lens can optionally be positioned between the volume of the composition and the flat mirror. An xz cylinder lens would preferably be used when the width of the light sheet is not constant as it passes through the volume in the container, for example, when the width of the light sheet is focused within the volume in the container. The purpose of the xz cylinder lens is to direct those reflected light sheet rays that are along the width of the light sheet (z direction) to retrace or substantially retrace the path of the generated light sheet rays and its focal length is chosen accordingly.

Such one or more optical elements can include an xy cylinder lens, preferably a negative cylinder lens, where "x" is defined to be in the direction of the light sheet illumination axis and "y" is defined to be in the direction of the light sheet height. More preferably, such negative cylinder lens comprises a negative cylinder lens with its curvature along the height (y) axis. The xy cylinder lens is preferably positioned between the flat mirror and the volume. The xy cylinder lens would preferably be used when the height of the light sheet is not constant as it passes through the volume in the container, for example, when the height of the light sheet decreases uniformly (compresses) with passage through the volume in the container. The purpose of the xy cylinder lens is to direct those reflected light sheet rays that are along the height of the light sheet (y direction) to retrace or substantially retrace the path of the generated light sheet rays and its focal length is chosen accordingly.

Such one or more optical elements can include both an xz cylinder lens and an xy cylinder lens. Preferably the xz cylinder lens comprises a positive cylinder lens and the xy cylinder lens comprises a negative cylinder lens. The xy cylinder lens is preferably positioned between the flat mirror and the volume and more preferably between the volume and the xz cylinder lens.

Another example of reflection optics useful in the present method can comprise a reflective optical element comprising a curved reflecting surface, such as, for example, a biconic mirror. An optical reflective element comprising a curved reflecting surface is particularly advantageous for use in achieving reflected light sheet rays that retrace or substantially retrace the path of the generated light sheet. A biconic mirror preferably includes an external surface defined by two different curvatures disposed substantially orthogonal to one another, wherein the centers of the two curvatures intersect at or substantially at the center of the mirror. Preferably the curvature of the surface of the biconic mirror along the width (z) axis is zero (planar) for the case of a constant width light sheet or concave for the case of a focused width light sheet. Preferably the curvature of the surface of the biconic mirror along the height (y) axis is zero (planar) for the case of a constant height light sheet or convex for the case of a decreasing height light sheet. A biconic mirror more preferably includes a first axis and a second axis orthogonal to the first axis, wherein curvature along the first axis is concave and curvature along the second orthogonal axis is convex.

Optionally reflection optics including a reflective optical element comprising a curved reflecting surface can further include one or more lenses and/or other optical elements.

A method in accordance with the present invention can further include adjusting the height profile of the reflected light sheet in the volume of composition in the workspace (e.g., a container) relative to the height of the generated light sheet for the purpose of adjusting the intensity uniformity through the container. Such height profile adjustment can include reflecting the generated light sheet with use of reflection optics configured to make such adjustment. Examples of such reflection optics include a reflective optical element including a flat reflecting surface and an xy cylinder lens. Preferably the xy cylinder lens is a negative cylinder lens with its curvature along the height (y) axis. Optionally, the xy cylinder lens can be replaced by a zoom optical system to provide a variable light sheet height adjustment. Such xy cylinder lens can optionally be positioned between the volume of the composition and the flat mirror. Such xy cylinder lens can be used together with an xz cylinder lens for the purpose of directing rays along the width (z) axis, in which case the xy cylinder lens is located preferentially between the volume of the composition and the xz cylinder lens.

Method in accordance with the present invention for improving light intensity uniformity of a light sheet passing through a volume of a composition can further include adjusting the height profile of the generated light sheet comprising passing the light sheet through a compression cylinder lens comprising a positive cylinder lens with its curvature along the height (y) axis before it passes into the volume of the composition. For example, use of a compression cylinder lens can result in a decreasing light sheet height with passage through the composition, with the resulting increase in power density (power/area) able to compensate or partially compensate for absorption in the composition, and its focal length is chosen according to the desired amount of compensation.

In embodiments of the present invention including adjusting the height profile of the generated light sheet comprising passing it through a compression cylinder lens before it passes into the volume of the composition, the reflection optics can comprise a reflective optical element including a flat reflecting surface in combination with an xy cylinder lens. Preferably the compression cylinder lens has its axis aligned with the xy cylinder lens' axis In embodiments of the present invention including reflection optics including a reflective optical element including a flat reflecting surface in combination with an xy cylinder lens and a compression cylinder lens on the opposite side of the workspace (e.g., between the light sheet generating system and the volume of the composition), the xy cylinder lens' focal length and the compression cylinder lens' focal length are preferably co-selected such that light rays included in the generated light sheet and the light rays included in the reflected light sheet proceed along a path that is the same or substantially the same path within the volume of the composition.

The present invention can further include adjusting the height profile of the reflected light sheet.

In embodiments of the present invention that further include adjusting the height profile of the reflected light sheet, the reflection optics can comprise a reflective optical element including a flat reflecting surface in combination with one or more optical elements wherein the one or more optical elements include a biconic lens, the biconic lens preferably being positioned between the volume of the composition and the flat reflecting surface. In such embodiments, the biconic lens can include an external surface defined by two different curvatures disposed substantially orthogonal to one another wherein the centers of the two curvatures intersect at or substantially at the center of the lens. The curvatures of the surfaces of the biconic lens are preferably configured such that the focusing power along the height (y) axis of the biconic lens is negative, and the focusing power along the orthogonal width (z) axis of the biconic lens is positive.

In other embodiments of the present invention that further include adjusting a dimension of the reflected light sheet, the reflection optics can comprise a biconic mirror. In such embodiments, the biconic mirror can include an external surface defined by two different curvatures disposed substantially orthogonal to one another, wherein the centers of the two curvatures intersect at or substantially at the center of the mirror. The curvatures of the surface of the biconic mirror are preferably configured such that the focusing power along the height (y) axis of the biconic mirror is negative, and the focusing power along the orthogonal width (z) axis of the biconic mirror is positive.

In methods in accordance with the present invention, the light sheet may comprise coherent linearly polarized light. (Such polarization can result from use of a coherent light source, such as a laser, to generate the light sheet.) In such case, the method can preferably further include neutralizing interference generated between the generated light sheet and the reflected light sheet. Such neutralizing step can comprise, for example, phase shifting the generated linearly polarized light sheet exiting the volume of the composition before being reflected by the reflection optics and phase shifting the reflected light sheet before passing back through the volume of the composition along the light sheet illumination axis.

Such neutralizing step can comprise, by way of example, passing the generated light sheet through a quarter wave plate before being reflected so as to generate circularly polarized light and passing the circularly polarized reflected light sheet back through the quarter wave plate before passing through the volume of the composition in the workspace so as to generate a linearly polarized reflected light sheet with polarization axis orthogonal to the polarization axis of the generated light sheet. A quarter wave plate typically has opposed major surfaces. Preferably the quarter-wave-plate is positioned between the reflecting surface of the reflective optical element and the volume of the composition with the opposed major surfaces of the quarter-wave plate being normal to the illumination axis and at least one of the fast or slow axis of the quarter wave plate being at an angle of 45 degrees relative to the linear polarization axis of the source.

Other techniques readily ascertainable by the skilled artisan for neutralizing such interference may alternatively be suitable.

If a coherent linearly polarized light source is included in the light sheet generating system, an apparatus including such light source can preferably further include a quarter-wave plate having opposed major surfaces and a fast axis and a slow axis, the quarter-wave-plate being positioned between the reflecting surface of the reflective optical element and the volume of the composition with the opposed majors surfaces of the quarter-wave plate being normal to the illumination axis and at least one of the fast or slow axis of the quarter wave plate being at an angle of 45 degrees relative to the linear polarization axis of the source.

Methods in accordance with the present invention can also include moving the combined generated and reflected lights sheet to selected locations in the volume. Such movement of the combined generated light sheet and reflected light sheet can comprise synchronized movement of the light sheet generating system and the reflection optics. Such synchronized movement can maintain the alignment of the generated and reflected light sheet along the same or substantially the same path in the volume.

A composition comprises a composition to be exposed to or treated by a light sheet passing through a volume thereof. A composition can comprise a single composition or a combination or mixture of two or more different compositions. The methods and apparatuses of the present invention are particularly useful with compositions that are or include a liquid. The methods and apparatuses for improving the uniformity of light intensity of a light sheet can also be useful with compositions with nonzero absorption at the light sheet wavelength that are not liquids or do not include liquid (e.g., solid compositions and gaseous compositions. The methods and apparatuses of the present invention are particularly advantageous with compositions that absorb the wavelength or wavelengths of light used to generate the light sheet.

As discussed above, improving the uniformity of the light intensity of a light sheet passing through a composition can be particularly advantageous in methods and apparatuses for forming an object in a volume of a composition comprising a photohardenable composition. For example, in methods and apparatuses for forming an object in a volume of a composition comprising a photohardenable composition, such improvement advantageously can facilitate obtaining improved resolution of features of objects formed in the volume. Such improved uniformity can also enlarge the portion of the volume in which an object can be formed.

In accordance with another aspect of the present invention there is provided a method of forming an object in a volume of a composition comprising a photohardenable composition, the method comprising:

(a) forming a combined light sheet including a first wavelength at a selected location in the volume of the photohardenable composition, the combined light sheet comprising a generated light sheet and a reflected light sheet, (b) projecting an optical image including a second wavelength into the volume of the photohardenable composition to intersect with the combined light sheet at the selected location in the volume, the optical image being projected into the volume along a projection axis perpendicular to a major face of the combined light sheet, the projected optical image being perpendicular to its projection axis, wherein the photohardenable composition is at least partially hardened at the intersection of the optical image and the combined light sheet; and (c) optionally repeating steps (a) and (b) until the object is partially or fully formed, wherein the intersection occurs at the same or a different selected location in the volume.

In accordance with another aspect of the present invention there is provided a method of forming an object in a volume of a composition comprising a photohardenable composition, the method comprising:

(a) forming a combined light sheet including a first wavelength at a selected location in the volume of the composition comprising the photohardenable composition comprising directing a generated light sheet along a light sheet illumination axis at the selected location through the volume of the composition and reflecting the light sheet exiting the volume of the composition back through the volume of the photohardenable composition, preferably along or substantially along the light sheet illumination axis, to form the combined light sheet, (b) projecting an optical image into the volume of the composition to intersect with the combined light sheet at the selected location in the volume, the optical image being projected into the volume along a projection axis perpendicular to the light sheet illumination axis, the projected optical image being perpendicular to its projection axis and the combined sheet being orthogonal to the direction in which the optical image is projected into the volume, wherein the composition comprising the photohardenable composition is at least partially hardened at the intersection of the optical image and the combined light sheet; and (c) optionally repeating steps (a) and (b) until the object is partially or fully formed, wherein, for a set of the repeated steps, the intersection occurs at the same or a different selected location in the volume.

The methods described herein can further including generating the light sheet. Generating a light sheet can comprise, for example, but not limited to, generating a light beam including coherent or incoherent light and using a line generation method such as a cylinder lens, Powell lens, or scanner. Other alternative techniques for generating a light sheet, as discussed below, can be used.

Preferably the reflected light sheet passing back through the volume of the composition comprising the photohardenable composition overlaps the generated light sheet in the volume.

The step of reflecting the light sheet in a method in accordance with the invention can comprise reflecting the light sheet with reflection optics including a reflective optical element such as, for example, a mirror. Reflection optics can further include one or more lenses and/or other optical elements.

Reflection optics useful in the present method can include a reflective optical element comprising a reflecting surface and can optionally further include one or more lenses and/or other optical elements. Reflection optics can optionally include a zoom optical system, the zoom optical system being positioned between the volume of the photohardenable composition and the reflective optical element.

More preferably the reflected light sheet is reflected back through the volume along the same illumination axis as that of the incident light sheet and in such a way that the reflected light sheet rays retrace or substantially retrace the path of the generated light sheet rays (e.g., as generated and directed through the volume) in its initial pass through the volume. The combination of the incident light sheet and the reflected light sheet passing through the volume along the incident light sheet illumination axis can increase uniformity of light sheet intensity along the incident light sheet illumination axis through the volume. Preferably the incident light sheet and the reflected light sheet are coplanar.

The combination of the generated and reflected light sheets can advantageously improve uniformity of light sheet intensity along the light sheet illumination axis through the volume of the composition comprising the photohardenable composition.

The height of the light sheet may be constant or variable as the light sheet passes through the volume of the photohardenable composition included in the container. For example, it may be desirable for the height of the light sheet to decrease uniformly (compress) as the light passes through the volume, so that the resulting increase in power density (power per area) compensates for absorption of the light sheet within the composition. Independently, the width of the light sheet may be constant or variable as the light sheet passes through the volume of the photohardenable composition. For example, it may be desirable for the light sheet to be focused with the focal point in the center of the volume (i.e., light sheet width is smallest at center of the volume included in the container and increases towards sides or edges of the volume in the of container) to maintain the width below a desired maximum value over the width of the volume, such as a width that is less than 100 μm. The choice of reflection optics useful in the present method is dependent on the height profile and independently on the width profile of the generated light sheet and is preferentially selected such that the reflected light sheet rays retrace or substantially retrace the path of the generated light sheet rays.

One example of reflection optics useful in the present method for reflecting the reflected light sheet can comprise a reflective optical element comprising a flat reflecting surface, such as, for example, a flat mirror.

Reflection optics including a reflective optical element can further include one or more optical elements, e.g., lenses.

Such one or more optical elements can include an xz cylinder lens, preferably a positive cylinder lens, where "x" is defined to be in the direction of the light sheet illumination axis and "z" is defined to be in the direction of the light sheet width. More preferably, such positive cylinder lens comprises a positive cylinder lens with its curvature along the width (z) axis. The xz cylinder lens can optionally be positioned between the volume of the composition and the flat mirror. An xz cylinder lens would preferably be used when the width of the light sheet is not constant as it passes through the volume in the container, for example, when the width of the light sheet is focused within the volume in the container. The purpose of the xz cylinder lens is to direct those reflected light sheet rays that are along the width of the light sheet (z direction) to retrace or substantially retrace the path of the generated light sheet rays and its focal length is chosen accordingly.

Such one or more optical elements can include an xy cylinder lens, preferably a negative cylinder lens, where "x" is defined to be in the direction of the light sheet illumination axis and "y" is defined to be in the direction of the light sheet height. More preferably, such negative cylinder lens comprises a negative cylinder lens with its curvature along the height (y) axis. The xy cylinder lens is preferably positioned between the flat mirror and the volume. The xy cylinder lens would preferably be used when the height of the light sheet is not constant as it passes through the volume of in the container, for example, when the height of the light sheet decreases uniformly (compresses) with passage through the volume in the container. The purpose of the xy cylinder lens is to direct those reflected light sheet rays that are along the height of the light sheet (y direction) to retrace or substantially retrace the path of the generated light sheet rays and its focal length is chosen accordingly.

Such one or more optical elements can include both an xz cylinder lens and an xy cylinder lens. Preferably the xz cylinder lens comprises a positive cylinder lens and the xy cylinder lens comprises a negative cylinder lens. The xy cylinder lens is preferably positioned between the flat mirror and the volume and more preferably between the volume and the xz cylinder lens.

Another example of reflection optics useful in the present method such that the reflected light sheet rays retrace or substantially retrace the path of the generated light sheet can comprise a reflective optical element comprising a curved reflecting surface, such as, for example, a biconic mirror. As discussed above, a biconic mirror preferably includes an external surface defined by two different curvatures disposed substantially orthogonal to one another, wherein the centers of the two curvatures intersect at or substantially at the center of the mirror. Preferably the curvature of the surface of the biconic mirror along the width (z) axis is zero (planar) for the case of a constant width light sheet or concave for the case of a focused width light sheet. Preferably the curvature of the surface of the biconic mirror along the height (y) axis is zero (planar) for the case of a constant height light sheet or convex for the case of a decreasing height light sheet. A biconic mirror more preferably includes a first axis and a second axis orthogonal to the first axis, wherein curvature along the first axis is concave and curvature along the second orthogonal axis is convex.

Optionally reflection optics including a reflective optical element comprising a curved reflecting surface can further include one or more lenses and/or other optical elements.

A method in accordance with the present invention for forming a three-dimensional object can further include adjusting the profile of the reflected light sheet in the volume of the composition comprising the photohardenable composition relative to the height of the generated light sheet for the purpose of adjusting the intensity uniformity through the container. Such height profile adjustment can include reflecting the generated light sheet with use of reflection optics configured to make such adjustment. Examples of such reflection optics include can a reflective optical element including a flat reflecting surface with an xy cylinder lens. Preferably the xy cylinder lens is a negative cylinder lens with its curvature along the height (y) axis. Optionally, the xy cylinder lens can be replaced by a zoom optical system to provide a variable light sheet height adjustment. Such xy cylinder lens can optionally be positioned between the volume of the composition and the flat mirror. Such xy cylinder lens can be used together with an xz cylinder lens for the purpose of directing rays along the width (z) axis, in which case the xy cylinder lens is located preferentially between the volume of the composition and the xz cylinder lens.

Methods in accordance with the present invention for forming a three-dimensional object can further include adjusting the height profile of the generated light sheet comprising passing the light sheet through a compression cylinder lens comprising a positive cylinder lens with its curvature along the height (y) axis before it passes into the volume of the composition comprising the photohardenable composition. For example, use of a compression cylinder lens will result in a decreasing light sheet height with passage through the composition, with the resulting increase in power density (power/area) able to compensate or partially compensate for absorption in the composition, and its focal length is chosen according to the desired amount of compensation.

In embodiments of the present invention including adjusting a dimension the height profile of the generated light sheet by passing it through a compression lens comprising a positive cylinder lens before it passes into the volume of the photohardenable composition, the reflection optics can comprise a reflective optical element including, e.g., a flat reflecting surface, in combination with an xz cylinder lens and an xy cylinder lens. Preferably the compression cylinder lens has its axis aligned with the xy cylinder lens' axis.

In embodiments of the present invention including reflection optics including a reflective optical element including, e.g., a flat reflecting surface, in combination with an xy cylinder lens and a compression cylinder lens on the opposite side of the workspace (e.g., between the light sheet generating system and a container including the volume of the composition comprising the photohardenable composition), the xy cylinder lens' focal length and the compression cylinder lens' focal length are preferably co-selected such that light rays included in the generated light sheet and the light rays included in the reflected light sheet proceed along a path that is the same or substantially the same path within the volume of the composition.

The present invention can further include adjusting the height profile of the reflected light sheet.

In embodiments of the present invention that further include adjusting the height profile of the reflected light sheet, the reflection optics can comprise a reflective optical element including, e.g., a flat reflecting surface, in combination with one or more optical elements wherein the one or more optical elements include a biconic lens, the biconic lens preferably being positioned between the volume of the composition or photohardenable composition, as the case may be, and the flat reflecting surface. In such embodiments, the biconic lens can include an external surface defined by two different curvatures disposed substantially orthogonal to one another wherein the centers of the two curvatures intersect at or substantially at the center of the lens. The curvatures of the surfaces of the biconic lens are preferably configured such that the focusing power along the height (y) axis of the biconic lens is negative, and the focusing power along the orthogonal width (z) axis of the biconic lens is positive.

In other embodiments of the present invention that further include adjusting a dimension of the reflected light sheet, the reflection optics can comprise a biconic mirror. In such embodiments, the biconic mirror can include an external surface defined by two different curvatures disposed substantially orthogonal to one another, wherein the centers of the two curvatures intersect at or substantially at the center of the mirror. The curvatures of the surface of the biconic mirror are preferably configured such that the focusing power along the height (y) axis of the biconic mirror is negative, and the focusing power along the orthogonal width (z) axis of the biconic mirror is positive.

In methods in accordance with the present invention, the light sheet may comprise coherent linearly polarized light. (Such polarization can result from use of a coherent light source, such as a laser, to generate the light sheet.) In such case, the method can preferably further include neutralizing interference generated between the generated light sheet and the reflected light sheet. Such neutralizing step can comprise, for example, phase shifting the generated linearly polarized light sheet exiting the volume of the composition comprising the photohardenable composition before being reflected by the reflection optics and phase shifting the reflected light sheet before passing back through the volume along the light sheet illumination axis.

Such neutralizing step can comprise, by way of example, passing the generated light sheet through a quarter wave plate before being reflected so as to generate circularly polarized light and passing the circularly polarized reflected light sheet back through the quarter wave plate before passing through the volume of the composition included in the workspace so as to generate a linearly polarized reflected light sheet with polarization axis orthogonal to the polarization axis of the generated light sheet. A quarter wave plate typically has opposed major surfaces. Preferably the quarter-wave-plate is positioned between the reflecting surface of the reflective optical element and the volume of the photohardenable composition with the opposed major surfaces of the quarter-wave plate being normal to the illumination axis and the fast or slow axis of the quarter wave plate being at an angle of 45 degrees relative to the linear polarization axis of the source.

Other techniques readily ascertainable by the skilled artisan for neutralizing such interference may alternatively be suitable.

If a coherent linearly polarized light source is included in the light sheet generating system, an apparatus including such light source can preferably further include a quarter-wave plate having opposed major surfaces and a fast axis and a slow axis, the quarter-wave-plate being positioned between the reflecting surface of the reflective optical element and the volume of the composition with the opposed majors surfaces of the quarter-wave plate being normal to the illumination axis and at least one of the fast or slow axis of the quarter wave plate being at an angle of 45 degrees relative to the linear polarization axis of the source.

Methods in accordance with the present invention can also include moving the combined generated and reflected lights sheet to selected locations in the volume. Such movement of the combined generated light sheet and reflected light sheet can comprise synchronized movement of the light sheet generating system and the reflection optics. Such synchronized movement can maintain the alignment of the generated and reflected light sheet along the same or substantially the same path in the volume.

An optical image projection system suitable for use in methods and apparatuses for forming a three-dimensional object in accordance with the invention can include a projection device and can optionally further include one or more optical components and/or mechanisms for translating the position of any of the components of the optical image projection system.

The optical image generated by the optical image projection system is projected into the volume of the composition comprising the photohardenable composition included in the workspace, e.g., a container. The composition is preferably included in a container. Since the container and the photohardenable composition therein have an index of refraction greater than that of air, the location of the image focal point within the photohardenable composition is farther from the optical image projection system than if the image were projected in air. The location of the image focal plane within the photohardenable composition is dependent on the indices of refraction of the container and photohardenable composition and the distance from the projection system to the container is dependent on the depths and indices of refraction of the container and the photohardenable composition.

For example, if both the container and the photohardenable composition have an index of refraction of n, where n is greater than the index of refraction of air (1), then the distance from projector to optical image focal plane is larger by a factor of n as compared to the case where the optical image projection is into air. This factor must be taken into account when moving the container relative to the projector to accurately position the object slices during printing; for example, if the slices representing an object are generated with a slice spacing of dz, then the incremental motion of the container relative to the projection system between slices must be dz/n. In further consequence of the refractive index effect on optical image focal plane location, it is preferred to have relative motion between the optical image projection system and the light sheet during printing of slices to maintain coincidence of the optical image focal plane and the light sheet. For example, a preferred displacement of the light sheet relative to the projector is [dz*(1−n)], noting that the displacement of the light sheet relative to the optical image projection system is in the opposite direction from the displacement of the container relative to the optical image projection system.

A light source included in an optical image projection system or, optionally, an external light source used to illuminate a projection device included in a projection system, is preferably selected taking into consideration the photohardenable composition being used and the hardening mechanism therefor. Such considerations include the wavelength(s) preferred for the particular photohardening mechanism and power levels preferred therefor. Selection of suitable light sources is within the skill of the person of ordinary skill in the relevant art.

It can be desirable for an optical image projection system for projecting an optical image including a second wavelength to be capable of being spatially modulated.

Spatially modulated excitation light can be created by known spatial modulation techniques, including, for example, a liquid crystal display (LCD), a digital micromirror display (DMD), a microLED array, a grating light valve, a galvanometer scanner, or a polygon mirror scanner. Other known spatial modulation techniques can be readily identifiable by those skilled in the art.

An optical system can be selected to apply continuous excitation light. The optical system can be selected to apply intermittent excitation light. Intermittent excitation can include random on and off application of light or periodic application of light. Examples of periodic application of light includes pulsing. The optical system can be selected to apply a combination of both continuous excitation light and intermittent light, including, for example, an irradiation step that includes the application of intermittent excitation light that is preceded or followed by irradiation with continuous light.

Examples of light sources of the excitation light that may be suitable for use in various aspects and embodiments of the present invention include, by way of example and non-limitation, lasers, laser diodes, light emitting diodes, light-emitting diodes (LEDs), micro-LED arrays, vertical cavity lasers (VCLs), and filtered lamps. Such light sources are commercially available and selection of a suitable light source can be readily made by one of ordinary skill in the relevant art. LEDs of the type such as Phlatlight LEDs available from Luminus for use with DMDs can be used. Other suitable light sources may also be useful. Preferably an excitation light source comprises a laser.

A projection device can be configured to project one or more optical projections to one or more selected locations in the volume.

Examples of projection devices for use in the methods and systems described herein may include, but are not limited to, a laser projection system, a liquid crystal display (also referred to herein as "LCD"), a spatial light modulator (also referred to herein as "SLM") (for example, but not limited to, a digital micromirror device (also referred to herein as "DMD")), a micro-LED array, a vertical cavity laser array (also referred to herein as "VCL"), a Vertical Cavity Surface Emitting Laser array (also referred to herein as "VCSEL"), a liquid crystal on silicon (also referred to herein as "LCoS") projector, and a scanning laser system. (Light emitting diode is also referred to herein as "LED").

Preferred projection devices include digital light processors, e.g., SLMs and DMD, with a DMD being more preferred.

Preferably the projection device is illuminated with a laser.

An optical image projection system can optionally further include one or more optical components (e.g., projection optics, illumination optics, lenses, lens systems, mirrors, prisms, etc.) An optical image projection system can optionally further include one or more light sources as part of the projection system or external to the projection system for illuminating the projection device. Use of external light sources can facilitate the flexibility of being able to readily change light sources with light sources for generating different wavelengths and/or light sources different power capabilities.

Other exemplary optical image projection systems and related information that may be useful in methods and apparatuses in accordance with one or more aspects and/or embodiments of the present invention are discussed in International Application No. PCT/US2022/039766 of Quadratic 3D, Inc. filed Aug. 9, 2022 for "Methods And Systems For Forming An Object In A Volume Of A Photohardenable Composition", which application is hereby incorporated herein by reference in its entirety.

Optionally, the excitation light can be temporally and/or spatially modulated. Optionally, the intensity of the excitation light can be modulated. Optionally, source drive modulation can be used to adjust the absolute power of the light beam.

Spatially modulated excitation light can be created by known spatial modulation techniques, including, for example, a liquid crystal display (LCD), a digital micromirror device (DMD), or a microLED array. Other known spatial modulation techniques can be readily identified by those of ordinary skill in the relevant art.

A light sheet generating system and/or an optical image projection system, if applicable, can be configured to apply continuous excitation light. Such systems can be configured to apply intermittent excitation light. Intermittent excitation can include random on and off application of light or periodic application of light. Examples of periodic application of light includes pulsing. Such systems can be configured to apply a combination of both continuous excitation light and intermittent light, including, for example, an irradiation step that includes the application of intermittent excitation light that is preceded or followed by irradiation with continuous light. Intermittent light may facilitate use of a higher instantaneous light intensity to increase printing speed.

As discussed above, in addition to a projection device, a projection system can further include additional components including, but not limited to, projection optics, and one or more translational stages for moving the system or components thereof.

The methods and systems disclosed herein can optionally further include the use commercially available projection and filtering techniques.

The methods and apparatuses described herein are typically used in combination with a computer and software. For example, light sheet generating systems, optical image projection systems and projection devices that may be included therein, that can be included in the methods and apparatuses described herein may be used in combination with a computer and software. Software can be used to coordinate generation of optical projections (e.g., point illuminations, line illuminations, a two-dimensional pattern, or a light sheet) from their respective optical projection system or projection devices at each position along the projection direction of each so that the part is developed plane by plane. The planar face of an optical projection can be orthogonal to its projection direction into photohardenable composition. When two optical projections are projected into the volume of the photohardenable composition, the projection directions of the two projections are preferably orthogonal to each other. Selection of computer controls and software is within the skill of the person of ordinary skill in the relevant art. Other components can also optionally be included or used with the system.

Systems and methods in accordance with the present invention advantageously further do not require adhering the object being printed to a fixed substrate (e.g., build plate) at the beginning of the printing process avoiding a post-processing step of separating the printed object from the fixed substrate.

Methods and systems described herein are particularly useful for forming or "printing" three-dimensional objects.

In accordance with another aspect of the present invention, there is provided an apparatus for forming an object in a volume of a composition comprising a photohardenable composition, the apparatus comprising:

a workspace configured to include a volume of a photohardenable composition, wherein the volume is optically accessible;

a light sheet generating system for generating and/or directing a light sheet including first wavelength light through the volume of the photohardenable composition included in the workspace along a light sheet illumination axis at a selected location in the volume; and reflection optics comprising a reflective optical element including a reflecting surface, the reflection optics being positioned and configured to reflect the generated light sheet exiting the volume of the photohardenable composition included in the workspace back through the volume of the photohardenable composition, preferably along or substantially along the light sheet illumination axis, an optical image projection system for projecting an optical image including second wavelength light into the volume of the photohardenable composition, wherein the light sheet generating system, reflection optics and optical image generating system are configurable for the optical image to intersect with the combined light sheet at the selected location in the volume with the optical image being projected into the volume along a projection axis perpendicular to the light sheet optical illumination axis.

The apparatus can further include a controller configured to selectively operate at least one, and preferably all, of the light sheet generating system, reflection optics, and optical image projection system so that the combined light sheet and optical image intersect at one or more selected locations in the volume of the photohardenable composition. Preferably, the light sheet generating system, reflection optics and optical image projection system are further configurable for the combined sheet to be orthogonal to the direction in which the optical image is projected into the volume.

In accordance with another aspect of the present invention, there is provided a printer including an apparatus of the present invention for forming an object in a volume of a composition comprising a photohardenable composition described herein.

In accordance with another aspect of the present invention, there is provided an apparatus for use in improving light intensity uniformity of a light sheet including a first wavelength passing through a volume of a composition which has nonzero absorption for the first wavelength, the apparatus comprising:

a workspace configured to include a volume of a composition, wherein the volume is optically accessible;

a light sheet generating system for generating and/or directing a light sheet including the first wavelength light through the volume of the composition included in the workspace along a light sheet illumination axis at a selected location in the volume; and reflection optics comprising a reflective optical element including a reflecting surface, the reflection optics being positioned and configured to reflect the generated light sheet exiting the volume of the composition included in the workspace back through the volume of the composition, preferably along or substantially along the light sheet illumination axis, wherein the reflected light sheet at least partially compensates for attenuation of light intensity of the generated light sheet when it passes through the volume of the composition.

The apparatus can further include a controller configured to selectively operate at least one, and preferably all, of the light sheet generating system and reflection optics. Preferably, the light sheet generating system and reflection optics are further configurable to facilitate the use of the combined light sheet in the intended end-use application.

As discussed above, if a coherent linearly polarized light source is included in the light sheet generating system, apparatuses described herein preferably further include a quarter-wave plate having opposed major surfaces, the quarter-wave-plate being positioned between the reflecting surface of the reflective optical element and the volume of the composition with the opposed majors surfaces of the quarter-wave plate being normal to the illumination axis and the fast or slow axis of the quarter wave plate being at an angle of 45 degrees relative to the linear polarization axis of the source.

Figure 3:
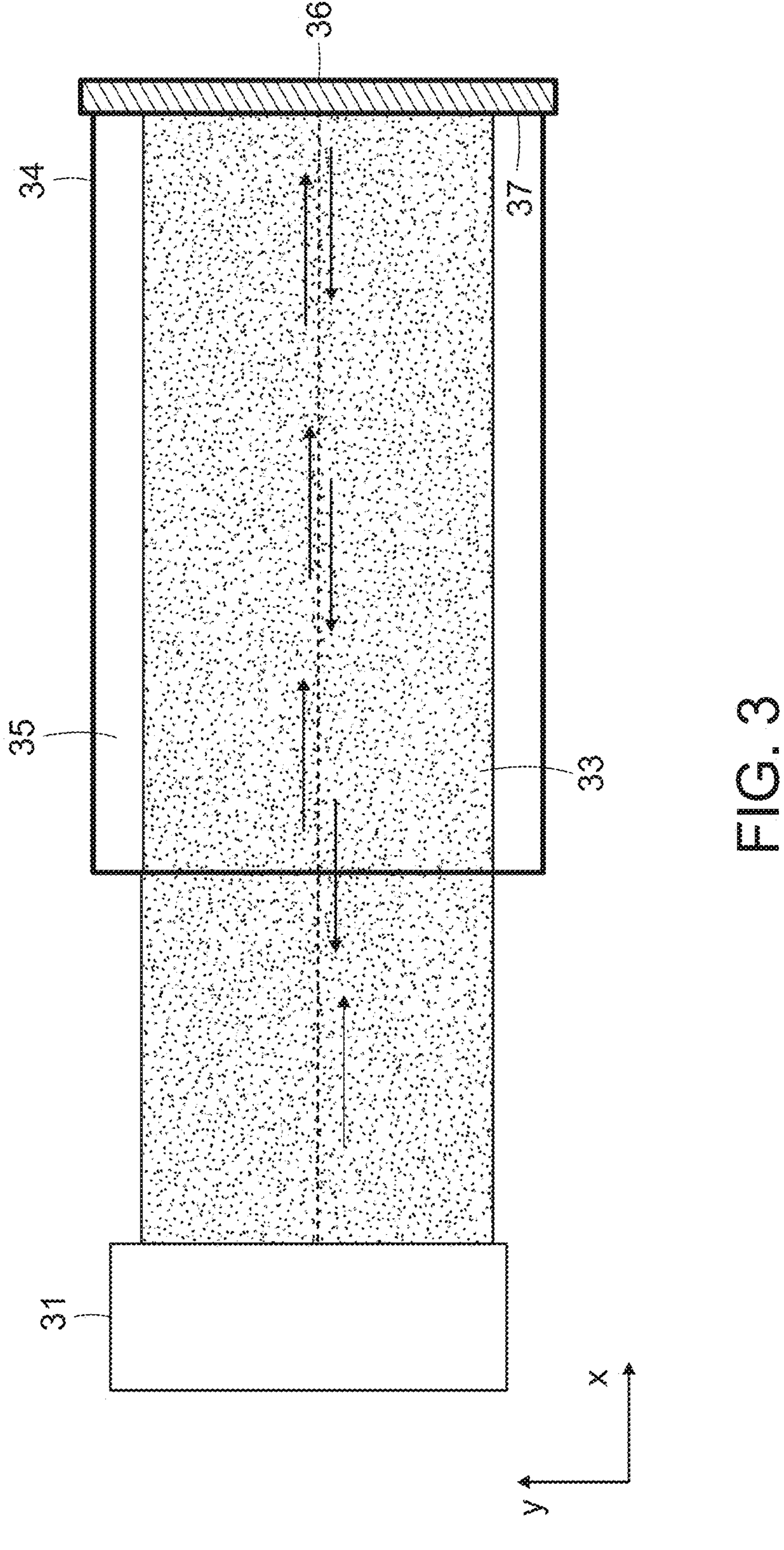
FIG. 3 depicts a diagram of a side view of an arrangement including a light sheet generating system and reflection optics in accordance with the present invention.

FIG. 3 shows a side view of diagram of an arrangement including of a light sheet generating system and reflection optics suitable for use in methods and apparatuses in accordance with the present invention. As shown in FIG. 3, the arrangement includes a light sheet generating system 31 for generating and/or directing a light sheet including first wavelength light through a workspace 34 configured to include a volume of a composition 35 (e.g., a photohardenable composition in a method or apparatus for forming an object) and reflection optics 36 positioned and configured to reflect the generated light sheet exiting the volume of the composition included the workspace back through the volume to form a combined light sheet 33.

A workspace is preferably configured to include one or more regions that are optically transparent and positioned such that the generated light sheet and reflected light sheet can access and pass through the volume of the composition included in the workspace. Optionally the entire workspace is optically transparent. Preferably a workspace comprises a container including one or more regions that are optically transparent and positioned such that the generated light sheet and reflected light sheet can access and pass through the volume of the composition included in the container. Optionally the entire container is optically transparent.

FIG. 3 depicts an embodiment including a workspace 34 comprising a volume of the composition 35. Examples of workspaces useful with a non-solid composition include containers configured to include a volume of a composition. A container preferably includes one or more optically transparent portions to at least facilitate the passage of a light sheet therethrough. It may be desirable for all sides of the container or the entire container to be optically transparent. A container can be open or closed in use. A container can be a one-piece unit or can be constructed from 2 or more pieces. Other suitable configurations can also be used.

Examples of preferred materials of construction for a container include, but are not limited to, glass, quartz, fluoropolymers (e.g., Teflon FEP, Teflon AF, Teflon PFA), cyclic olefin copolymers, polymethyl methacrylate (PMMA), polynorbornene, sapphire, or transparent ceramic.

Preferably optically transparent portion(s) of the container is (are) also optically flat.

A container can be an open container or a closable container. Optionally the container can be closed in use. A container can be of any suitable shape including square, rectangular, other polygon shape, or cylindrical.

In the embodiment shown in FIG. 3, a light sheet generated by the light sheet generating system 31 is directed to pass through the volume 35 along a light sheet illumination axis. Preferably the light sheet is incident at normal incidence (zero angle of incidence) to the volume of the composition in the workspace. The generated light sheet passing through and exiting the volume of the composition is reflected by reflection optics 36 and re-enters the container in the opposite direction and passes back through the volume, preferably along or substantially along the light sheet illumination axis and in such a way that the reflected light sheet rays retrace or substantially retrace the path of the generated light sheet rays. Reflection of the generated light sheet exiting the volume back through the volume can compensate for at least a portion of absorption of the generated light sheet by the volume of the photohardenable composition or other composition such that the combination of the generated light sheet and reflected light sheet can improve (e.g., increase) uniformity of light sheet intensity in the volume.

If the light sheet is collimated in xy and xz, inclusion of lenses and/or other optical elements between the workspace and a reflective optical element including a planar reflecting surface is not needed in order for the reflected light sheet rays to retrace or substantially retrace the path of the generated light sheet rays.

The reflection optics include a reflective optical element 36 including a reflecting surface 37, such as a mirror, and can optionally further include one or more lenses and/or other optical components.

While the reflection optics depicted in FIG. 3 are shown as a reflective optical element including a flat reflecting surface 37, if the light sheet is incident at a nonzero angle of incidence to the volume of the composition in the workspace, it may be desirable or preferred to include a reflective optical element including a curved reflecting surface or a reflective optical element including a planar reflective surface together with additional optical elements for preferably directing the reflected light sheet along a path through the volume that is the same or substantially the same as that of the generated light sheet on its initial pass.

FIG. 3 shows a diagram of a side view of an example of an embodiment of the present invention in which the generated light sheet on its first pass through the volume has zero angle (e.g., generated with collimated light) in which the reflected light sheet that is reflected from a planar reflective optical element will reflect back through the volume along the path of the first pass of the generated light sheet.

Figure 4:
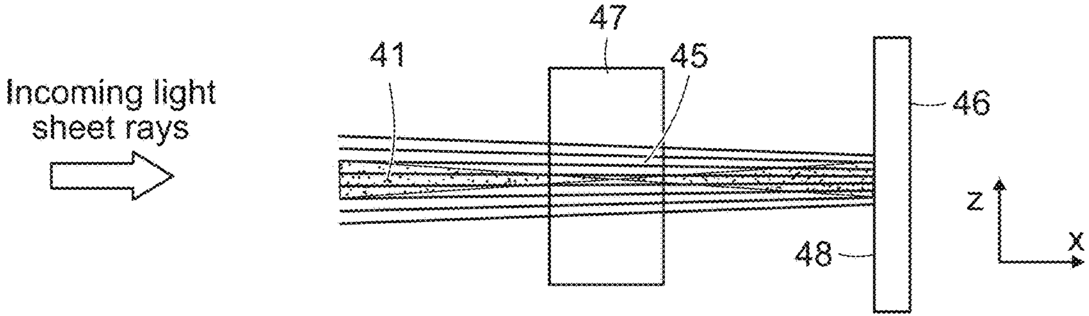
FIG. 4 is a top view of an embodiment of the invention including a light sheet and reflected light sheet passing through a container after reflection from a reflective optical element including a flat (planar) reflecting surface.
Figure 5:
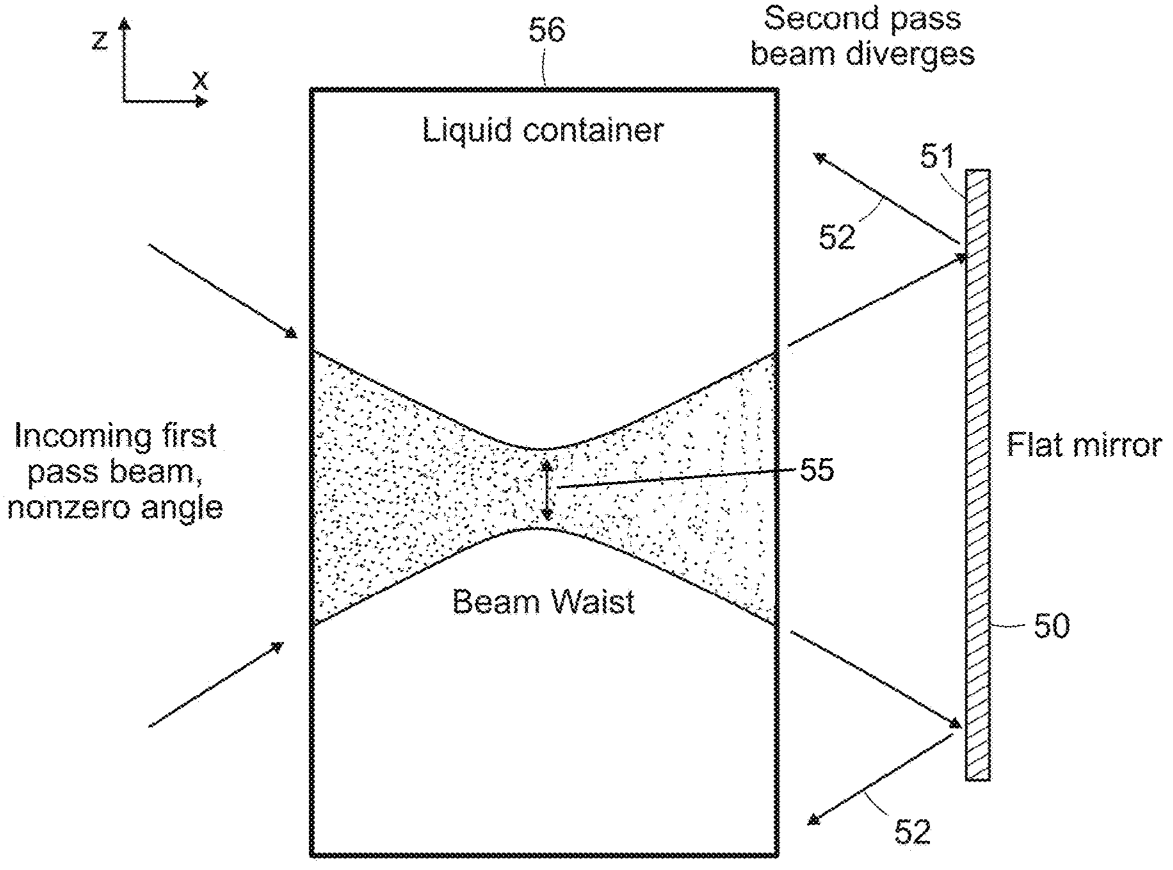
FIG. 5 illustrates a diagram of an embodiment of the invention including a light sheet and reflected light sheet passing through a container in which the reflected light sheet diverges after reflection from a reflective optical element including a flat (planar) reflecting surface.

FIG. 4 shows a top view of a schematic of the light rays of an incoming focused light sheet 41 and the resulting reflected light sheet 45 along the path of the light sheets passing through the center of the volume included in a workspace 47 (e.g., a container) showing that the reflected light sheet diverges (depicted as fanning of the reflected rays) after reflection from a reflective optical element 46 including a flat (planar) reflecting surface 48, demonstrating a preference for a non-planar reflecting surface or a planar reflecting surface in conjunction with additional optical elements in cases where width of the incoming light sheet is not collimated or near collimated The generated light sheet is preferably configured such that a narrow light sheet width (z direction) is maintained throughout the volume of the container. This is typically accomplished by focusing the width dimension of the generated light sheet such that the focus region or beam waist is positioned at the center of the container. In an embodiment in which a narrow light sheet width (z direction) is maintained throughout the volume of the container by focusing the width dimension of the generated light sheet, the width of the light sheet will be divergent when exiting the container. If the reflection optics in such embodiment include a reflective optical element 50 with a flat reflecting surface 51 such as, for example, a flat mirror (as shown), the reflected light sheet will also diverge 52, as shown in FIG. 5, and thus not focus to a waist 55 at the center of the container 56. As a result, the combined generated light sheet and reflected light sheet (e.g., the light sheet which is the sum of first and second pass) will have a width (dimension along the z dimension) within the volume that is larger than the width of the generated light sheet alone. In a preferred configuration, optics are used between the container and the reflecting surface to adjust the divergence of the reflected light sheet so that it reflects along the same or substantially the same path as the generated light sheet in the z dimension, such that the narrow width of the light sheet in the z dimension is preserved. In an alternative configuration, a curved reflecting surface may be used with or without additional optical elements to achieve this same result.

In an embodiment in which the width dimension of the light sheet is focused such that the focal location is within the volume of the composition included in the workspace, there is an inverse dependency between the width (depicted as the z dimension in FIG. 5 and FIGS. 6A and 6B) of a light sheet at beam waist in the center of the volume in the workspace (such as, for example, a volume of a photohardenable composition included in a container) and the width of the light sheet at the edges thereof.

Figure 6A:
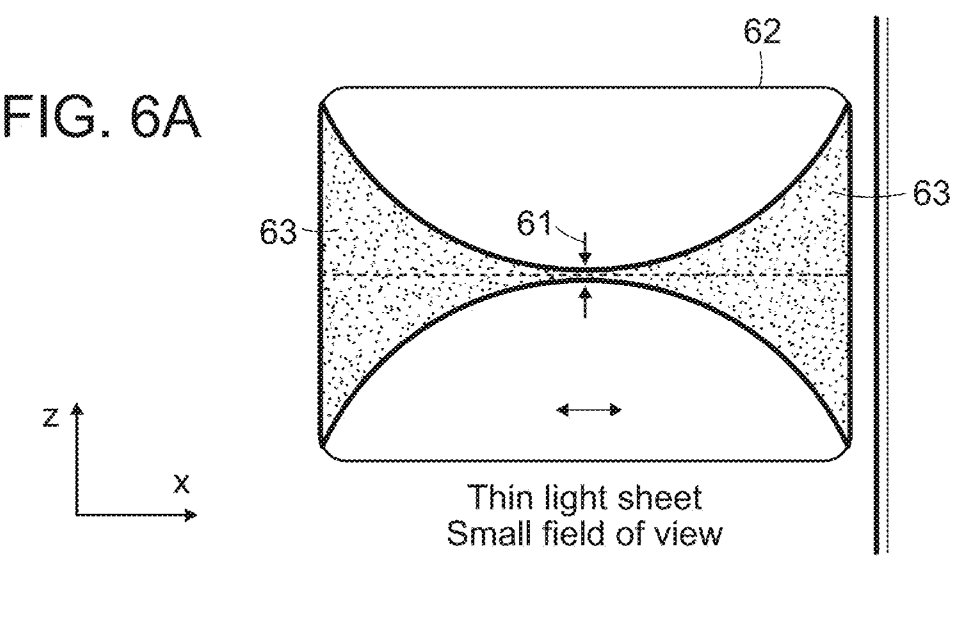
FIG. 6A illustrates a top view of an example of an embodiment of the present invention including reflection optics including a flat mirror and a light sheet configured to have a narrow width at the beam waist at the center of the volume for a small field of view resulting in a larger width at each of the light sheet edges.

For example, if the optical system for generating the light sheet is configured such that the light sheet waist 61 width is narrower as shown in the diagram of FIG. 6A (such as, e.g., by using an optical system including optics with a high NA (e.g., 0.05 or larger) and/or a container 62 with a large depth (x) (e.g., depth of 10 mm or more), then the light sheet width at container edges 63 will be substantially larger than the dimension of the light sheet at container center. In this case, it may be preferable to utilize optics between the container and the reflecting surface and/or to use a curved reflecting surface to adjust the divergence of the reflected light sheet so that it reflects along the same or substantially the same path as the generated light sheet in the z dimension, such that the narrow width of the light sheet in the z dimension is preserved.

Figure 6B:
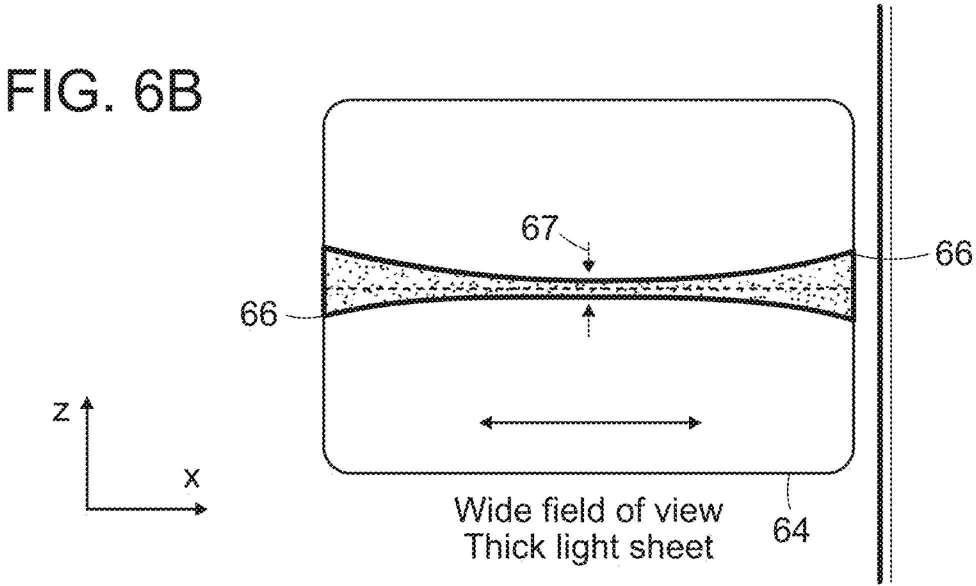
FIG. 6B illustrates a top view of an example of an embodiment of the present invention including reflection optics including a flat mirror and a light sheet configured to have a thick width at the beam waist at the center of the volume for a wide field of view resulting in a larger width at each of the edges, the increase in the width at the edges being less than the increase observed for a small field of view.

Alternatively, if the optical system for generating the light sheet includes optics with a low NA (e.g., 0.05 or smaller) and/or the container 64 has a small depth (dimension x), (e.g., 10 mm or smaller) and/or the requirement on z resolution is moderate (e.g., 100 μm or higher) the difference in width between center at the waist 67 and edges 66 of container may be relatively small (e.g., in a range from about +/−10%) as shown in the diagram of FIG. 6B. In this case, the light sheet divergence may be low enough that it may be acceptable to utilize a planar reflecting surface to reflect the generated light sheet without the use of additional optics between the container and the planar reflecting surface.

To control the angles of the reflected light sheet in the xz profile direction, so that the reflected light sheet is preferably redirected to overlap the generated light sheet in the xz profile, the reflection optics can preferably be configured for adjusting the curvature of the wavefront of the generated light sheet exiting the volume of the composition following its first pass therethrough.

Figure 7A:
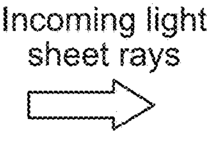
FIGS. 7A. and 7B depict diagrams of examples of reflection optics suitable for use in the present invention.
Figure 7A:
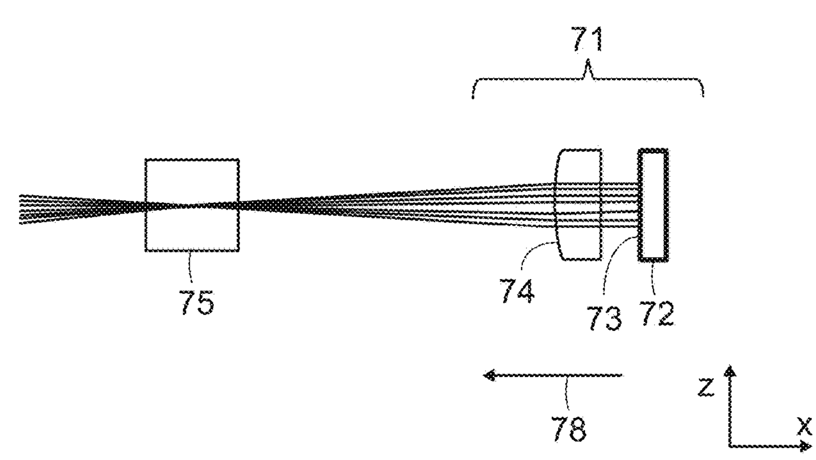
Figure 7B:
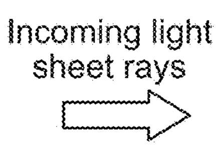
FIG. 7C depicts a perspective view of the example shown in FIG. 7B.
Figure 7B:
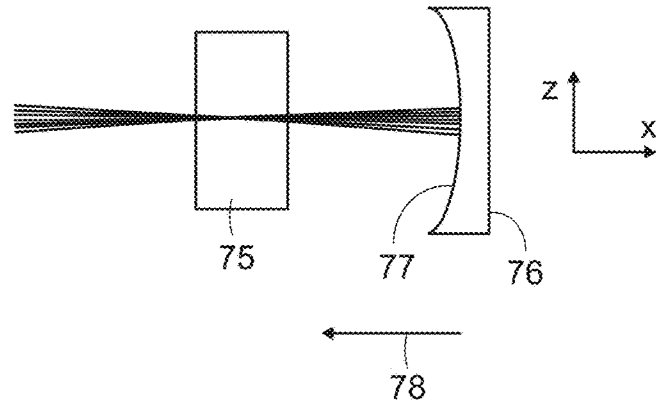
Figure 7C:
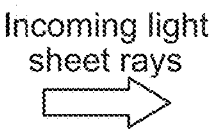
Figure 7C:
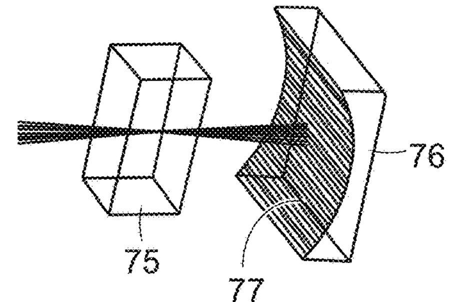

FIGS. 7A-7C depict non-limiting examples of reflection optics useful for redirecting the reflected light sheet to pass through the volume included in the workspace along the same or substantially the same path as the generated light sheet on its first pass.

FIG. 7A shows an example of reflection optics 71 including a reflective optical element 72 including a flat reflecting surface 73 (such as a flat mirror) and an xz cylinder lens 74. In the example shown in FIG. 7A, the xz cylinder lens is positioned between the flat reflecting surface 73 of the reflective optical element 72 and the workspace 75 including a volume of the composition (such as a container including a volume of a composition). The focal length of the xz cylinder lens 74 and the distance from the lens to the workspace 75 can be co-determined such that light is collimated or substantially collimated between the cylinder lens and the reflective optical element. Arrow 78 shows the direction of the reflected rays.

Preferably, the xz cylinder lens comprises a positive cylinder lens.

FIG. 7B shows an example of reflection optics including a reflective optical element 76 including a biconic reflecting surface 77 (such as, for example, a biconic mirror). FIG. 7C is a perspective view of the embodiment shown in FIG. 7B.

With reflection optics including a reflective optical element with an appropriately curved reflecting surface (such as, for example, a biconic mirror), a beam that is focused in the center of the workspace can reflect in such a way that the reflected light sheet proceeds along the same or substantially the same path as the generated light sheet in its first pass through the workspace. Such reflection optics can help preserve the thinness of the combined generated and reflected light sheets.

Preferably the radius of curvature of the reflecting surface of the reflective optical element and distance from the reflective optical element to the workspace are set taking into consideration the depth of the container and the index of refraction of the container and the photohardenable composition. In practice, one could fabricate a mirror with a convenient curvature then use optical methods to position it at an appropriate position in relation to the container. Such determination of curvature and position are within the skill of a person of ordinary skill in the relevant art.

A biconic mirror having a curvature in only one direction is particularly useful for preventing a change in the vertical dimension of the light sheet.

Inclusion of reflection optics including a reflective optical element including a biconic reflecting surface (such as, for example, a biconic mirror) can provide more flexibility with distance from the workspace to the reflective optical element than reflective optics including more than one component such as the example shown in FIG. 7A.

More preferably compensation for absorption of a light sheet passing through the composition included in the workspace can be further enhanced by also adjusting the height of the reflected light sheet passing back through the photohardenable composition.

Figures 8A, 8B:
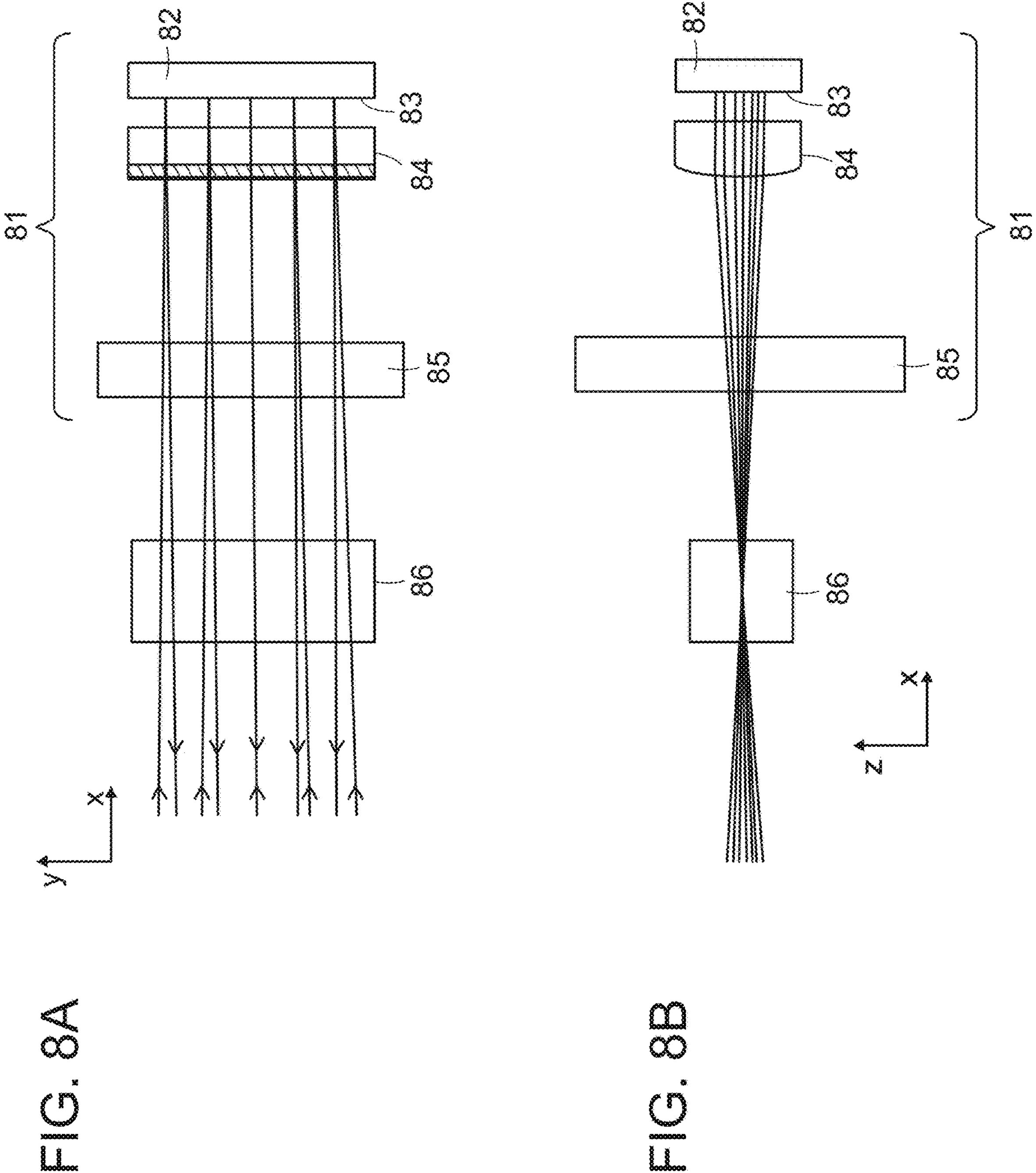
FIGS. 8A, 8B, and 8C depict diagrams of additional examples of reflection optics for use in the present invention.

As shown in FIGS. 8A (side view) and 8B (top view), for example, in methods and apparatuses including reflection optics 81 including a reflective optical element 82 including a flat reflecting surface 83 and an xz cylinder lens 84, compensation for absorption can be further enhanced by including an xy cylinder lens 85 in the reflection optics. Inclusions of an xy cylinder lens with an axis orthogonal to the xz cylinder lens can be used on the side of the workspace from which the generated light sheet exits the workspace to adjust the height of the reflected light sheet (in the y dimension) before passing back through the workspace 86, without affecting the focal profile of the light sheet in the z (width) dimension. Such height adjustment can further adjust the area illuminated when the reflected light sheet passes back through the workspace as a function of depth within the container (x), which can further also adjust the power density thereof as a function of x. For example, if the reflected light sheet is converging (i.e., its height is decreasing as it passes through the workspace), then the resulting power density increase (power per area increase) with passage through the workspace can compensate for absorption of the light sheet as it passes through the workspace. In FIG. 8A, the right facing arrows indicate the direction of generated light sheet rays and left facing arrows indicate the direction of reflected light sheet rays.

The xz cylinder lens 84 in FIGS. 8A and 8B comprises a positive cylinder lens.

Preferably the xy cylinder lens 85 comprises a negative cylinder lens. The amount of compensational height adjustment provided is according to the focal length of the lens with a shorter focal length capable of providing a greater amount of adjustment.

Figure 8C:
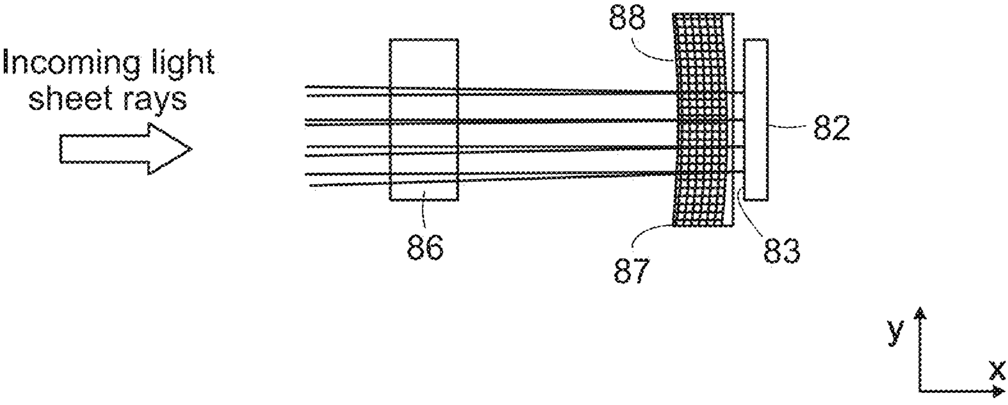

In an alternative example (as shown in FIG. 8C), the xz cylinder lens and xy cylinder lens comprising a negative cylinder lens can be replaced by a biconic lens 87 having a surface 88 with two different curvatures disposed substantially orthogonal to one another, wherein the centers of the two curvatures intersect at or substantially at the center of the lens. Such replacement advantageously eliminates any co-alignment step that may be called for when an xz cylinder lens t and an xy cylinder lenses are included in the reflection optics. The inclusion of a biconic lens between the container and the reflective optical element 82 depicted with a flat reflecting surface 83 in place of an xz cylinder lens and an xy cylinder lens can also result in higher efficiency by reducing the number of surfaces through which the reflected light sheet passes before entering the workspace 86 including the composition.

Optionally, the xy cylinder lens can be replaced by a zoom optical system (not shown) to provide a variable compensation adjustment.

Figure 9:
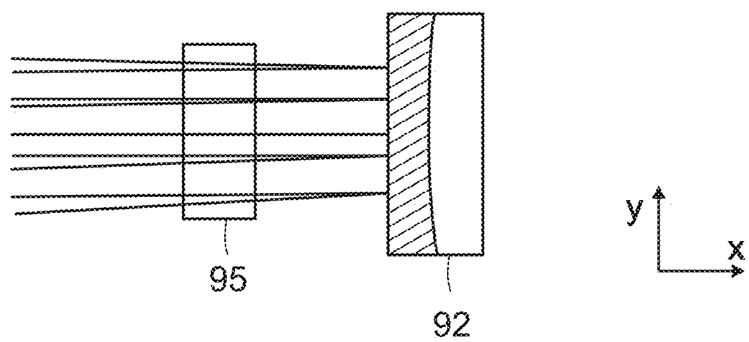
FIG. 9 depicts a diagram of an example of reflection optics comprising a biconic mirror suitable for use in the present invention.

Alternatively, as shown in FIG. 9, reflection optics including a reflective optical element 92 comprising a biconic mirror can be used in place of combination of a reflective optical element comprising a flat reflecting surface and a bionic lens or combination of cylindrical lenses (also referred to herein as cylinder lenses) for adjusting the height of the reflected light sheet for further enhancing compensation for light absorption of the generated light sheet. The inclusion of a biconic mirror in place of a reflective optical element comprising a flat reflecting surface and a biconic lens or combination of lenses can also result in higher efficiency by reducing the number of surfaces through which the reflected light sheet passes before entering the workspace 95 including the composition(e.g., a container including a volume of the composition).

In a further alternative example (not shown), a toroidal mirror can be substituted for the biconic mirror in FIG. 9. Such substitution can provide similar advantages.

While a biconic mirror or a toroidal mirror can redirect the reflected light sheet without further inclusion of one or more optical elements, one or more optical elements, e.g., lenses, can optionally be further included in the reflection optics.

Enhancement of compensation for absorption that can be obtained for embodiments of the invention can be further increased by inclusion of a compression cylinder lens on the side of the container or workspace through which the generated light sheet enters the workspace on its first pass through the volume of the composition.

Figures 10A, 10B:
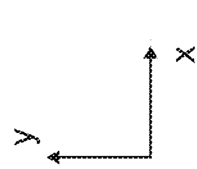
FIG. 10A depicts a diagram of a side view and FIG. 10B depicts a diagram of a top view of the same lens configuration of optical elements for inclusion in an embodiment of the present invention.

FIG. 10A depicts a diagram of a side view and FIG. 10B depicts a diagram of a top view of an example of embodiments of a method and apparatus in accordance with the present invention including a light sheet generated with an incoherent light source (such as, for example, an LED). The depicted example includes a reflective optical element 100 including a flat reflecting surface 101, such as a flat mirror, an xz cylinder lens 102 between the flat reflecting surface and the workspace 103, and a compression cylinder lens 106 between the light sheet generating system (not shown) and the composition with nonzero absorption of the first wavelength of light (e.g., a photohardenable composition) included in the workspace (e.g., a container). The compression cylinder lens has curvature along the height (y) axis of the light sheet so that the height of the light sheet decreases with passage through the container. FIGS. 10A and 10B show that for this example the focal point of the compression cylinder lens 106 is located at the flat reflecting surface 101 of the reflective optical element 100 so that the reflected light sheet ray path along the height (y) axis retraces or substantially retraces the path of the generated light sheet.

Figure 11A:
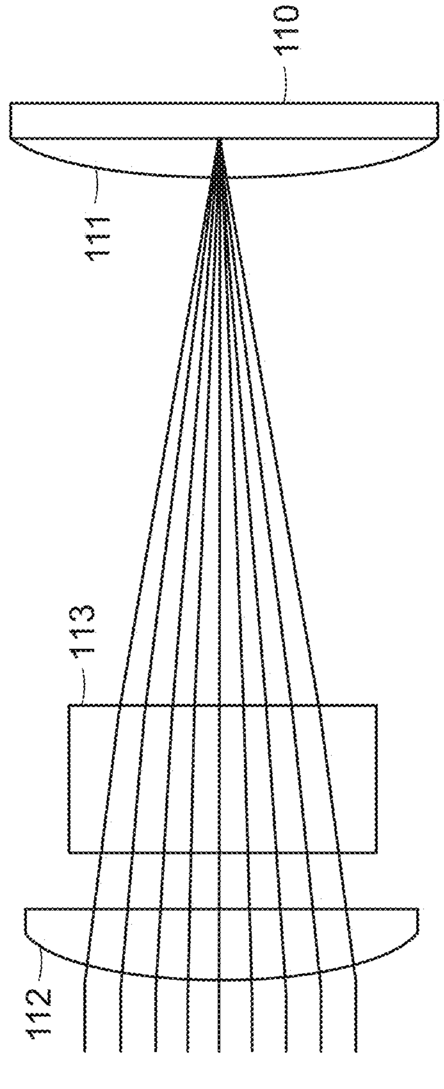
FIG. 11A depicts a diagram of a side view and FIG. 11B depicts a diagram of a top view of the same lens configuration of optical elements for inclusion in an example of an embodiment of the present invention.
Figure 11B:
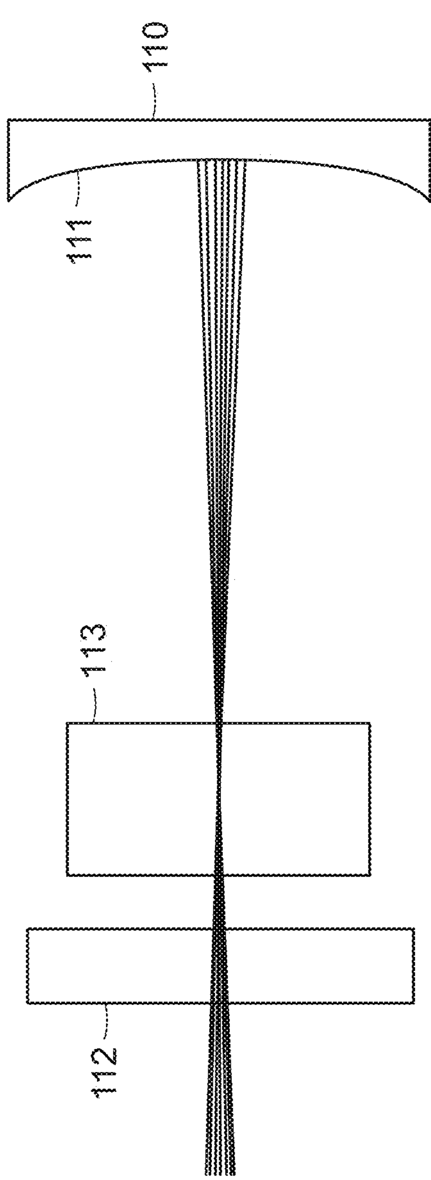

FIG. 11A depicts a diagram of a side view and FIG. 11B depicts a diagram of a top view of an example of embodiments of a method and apparatus in accordance with the present invention including a light sheet generated with an incoherent light source (such as, for example, an LED). The depicted example includes a reflective optical element 110 including a curved reflecting surface 111, such as a biconic mirror, for reflecting the light sheeting exiting the volume of the composition in the workspace 113 and a compression cylinder lens 112 comprising a positive cylinder lens between the light sheet generating system (not shown) and the volume of the composition with nonzero absorption for the light sheet wavelength (e.g., a photohardenable composition) included in the workspace. The compression cylinder lens has curvature along the height (y) axis of the light sheet so that the height of the light sheet decreases with passage through the container. FIGS. 11A and 11B show that for this example the focal point of the compression cylinder lens 112 is located at the curved reflecting surface 111 of the reflective optical element 110 so that the reflected light sheet ray path along the height (y) axis retraces or substantially retraces the path of the generated light sheet.

Figure 12A:
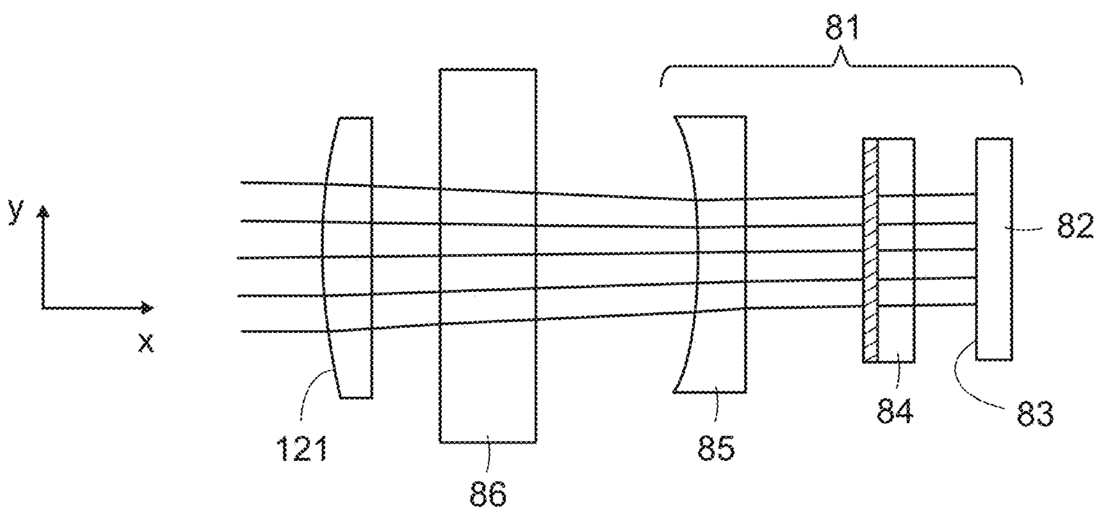
FIG. 12A depicts a diagram of a side view and FIG. 12B depicts a diagram of a top view of the same lens configuration of optical elements for inclusion in an embodiment of the present invention.
Figure 12B:
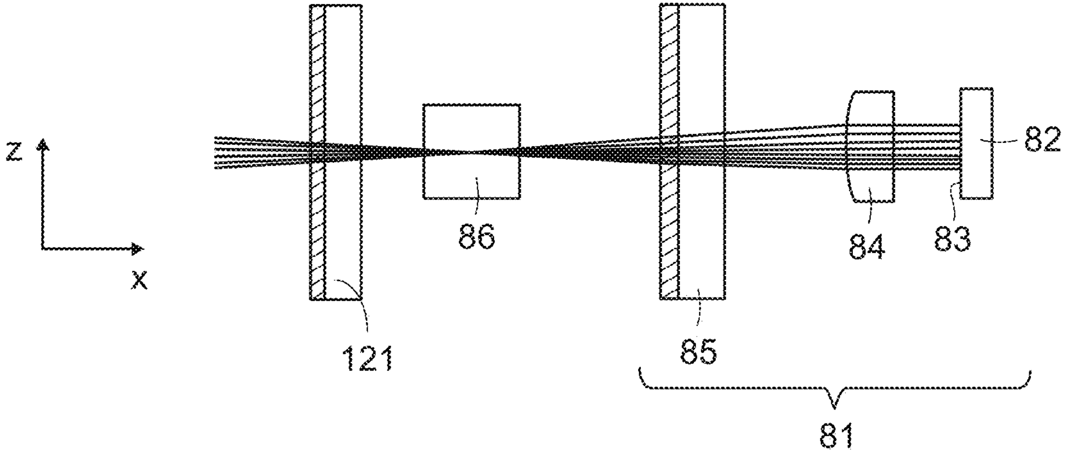

FIG. 12A depicts a diagram of a side view and FIG. 12B depicts a diagram of a top view of the same lens system for an example of an embodiment of an apparatus in accordance with the present invention including reflection optics 81 including a reflective optical element 82 including a flat reflecting surface 83. FIGS. 12A and 12B respectively depict the reflection optics 81 shown in FIGS. 8A and 8B in an arrangement that further includes a compression (positive) cylinder lens 121 on the side of the workspace 86 opposite the xy cylinder lens 85.

For example, in embodiments of the present invention including reflection optics including a reflective optical element including a flat reflecting surface and an xz cylinder lens and an xy cylinder lens comprising a negative cylinder lens, the inclusion of a compression cylinder lens on the opposite side of the workspace can provide increased compensation for absorption. Preferably the focal lengths of the xy cylinder lens and the compression cylinder lens are co-chosen such that the height of the generated light sheet decreases with passage through the container, and thus the irradiance (power per area) of the generated light sheet increases with passage through the container, thus providing some compensation for resin absorption on the first pass of the generated light sheet through the composition included in the workspace (e.g., photohardenable composition) and the rays of the generated light sheet reflected off the mirror return on the same or substantially the same optical path, thus providing additional such compensation for light absorption by the composition on the second pass. (A photohardenable composition may also be referred to herein as a resin.)

The amount of decrease in light sheet height as the generated light sheet passes through the container or workspace, and thus the amount of absorption compensation, can be determined by the focal length of the compression cylinder lens that is on the side of the workspace through which the generated light sheet enters the workspace. Preferably the focal length of the compression cylinder lens on the opposite side of the workspace is chosen to provide an appropriate amount of compensation for absorption while maintaining an acceptable light sheet height at the far end of the container.

The inclusion of a compression cylinder lens on the side of the workspace through which the generated light sheet first enters the workspace can provide similar increase absorption compensation for embodiments in which the xz cylinder lens and xy cylinder lens included in reflection optics are replaced by a biconic lens and for embodiments in which a reflective optical element including a flat reflecting surface and first and xy cylinder lenses are replaced by a reflective optical element including a reflecting surface having an appropriate biconic curvature.

As discussed above, the substitution of combinations of lenses with a biconic lens and the inclusion of a biconic mirror in place of a reflective optical element comprising a flat reflecting surface and a combination of lenses can also result in higher efficiency by reducing the number of surfaces through which the reflected light sheet passes before entering the workspace.

Figure 13:
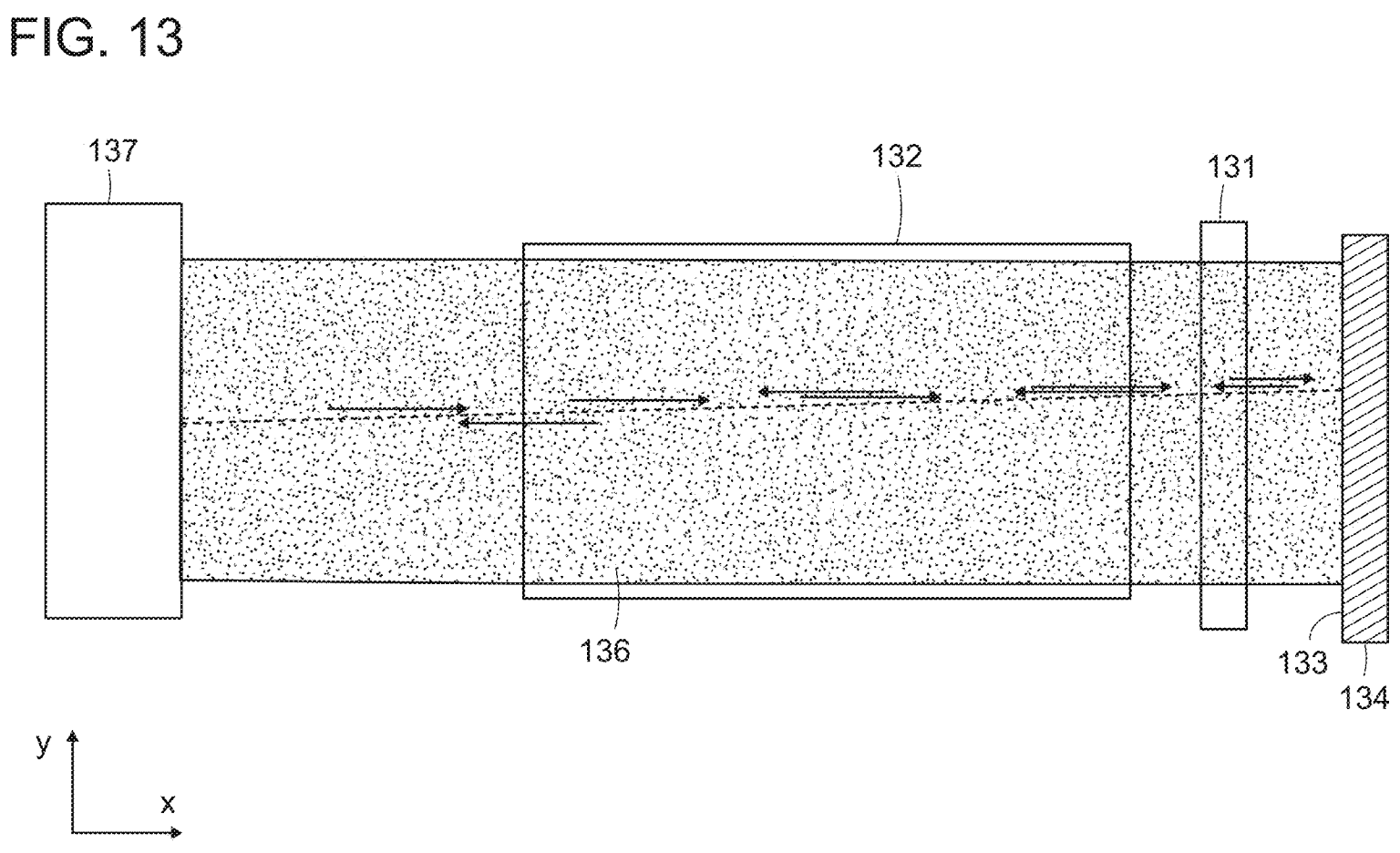

In aspects of the invention including a coherent light sheet with linear polarization as shown in FIG. 13, a quarter wave plate 131 is preferably included between the workspace 132 and the reflecting surface 133 of the reflective optical element 134 of the reflection optics. A light sheet 136 with linear polarization results from generation of a light sheet from a light sheet generating system 137 including with a coherent linearly polarized light source (e.g., a laser) (not shown).

Inclusion of a quarter wave plate eliminates destructive interference that may occur within the workspace as a result of interference between a generated light sheet with linear polarization (e.g., a light sheet generated from a coherent linearly polarized light source) and a reflected light sheet, also linearly polarized and with polarization axis identical to the polarization axis of the generated light sheet.

Figures 14A, 14B:
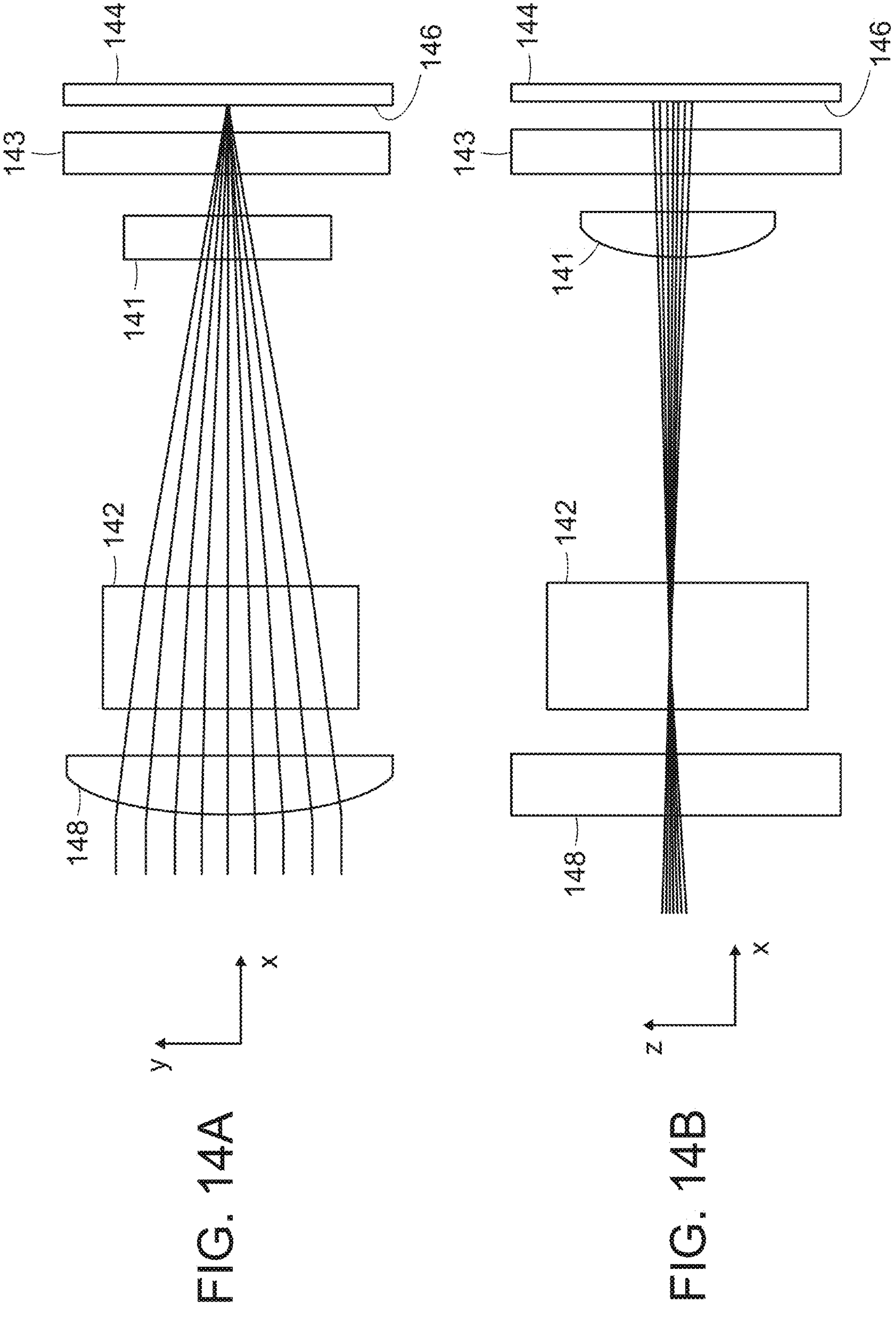
FIG. 14A depicts a diagram of a side view and FIG. 14B depicts a diagram of a top view of the same lens configuration for inclusion in an embodiment of the present invention.

FIG. 14A depicts a diagram of a side view and FIG. 14B depicts a diagram of a top view of an example of embodiments of a method and apparatus in accordance with the present invention including a light sheet generated with a coherent light source. The depicted example includes a reflective optical element 144 including a flat reflecting surface 146 (such as a flat mirror), an xz cylinder lens 141, preferably a positive cylinder lens, positioned between the flat reflecting surface and the workspace 142, and a compression cylinder lens 148 between the light sheet generating system (not shown) and the volume of the composition with nonzero absorption for the light sheet wavelength (e.g., a photohardenable composition)) included in the workspace 142 (such as, for example, a container). The compression cylinder lens has curvature along the height (y) axis of the light sheet so that the height of the light sheet decreases with passage through the container. The depicted example further includes a quarter wave plate 143 positioned between the xz cylinder lens and the flat reflecting surface of the reflective optical element. FIGS. 14A and 14B show that for this example the focal point of the compression cylinder lens 148 is at the flat reflecting surface 146 of the reflective optical clement 144 the reflected light sheet ray path along the height (y) axis retraces or substantially retraces the path of the generated light sheet.

Figure 22A:
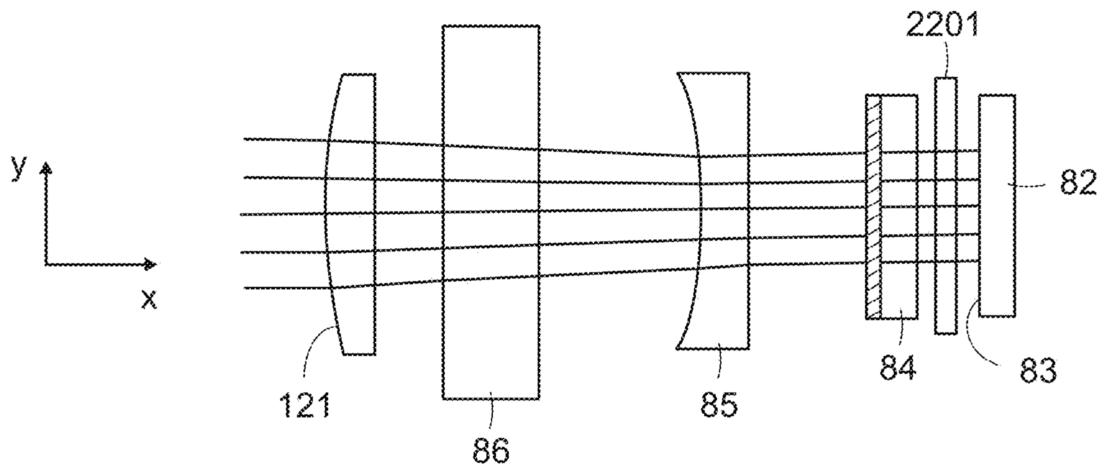
FIG. 22A depicts a diagram of a side view and FIG. 22B depicts a diagram of a top view of the same lens configuration of optical elements for inclusion in an embodiment of the present invention including a light sheet generated with coherent light.
Figure 22B:
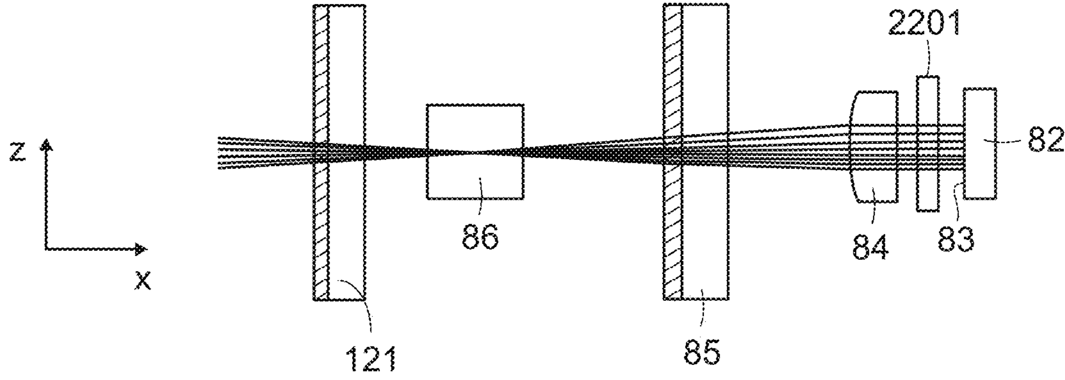

FIG. 22A depicts a diagram of a side view and FIG. 22B depicts a diagram of a top view of an example of a preferred embodiment of the present invention including a light sheet generated with a coherent light source. The depicted embodiment includes an xz cylinder lens 84, preferably a positive cylinder lens, positioned between the flat reflecting surface 83 and the workspace 86, an xy cylinder lens 85 positioned between the xz cylinder lens and the workspace. and a compression cylinder lens 121 between the light sheet generating system (not shown) and the workspace 86 (such as a container including a volume of a composition. FIGS. 22A and 22B respectively depict the reflection shown in FIGS. 12A and 12B in an arrangement that further includes a quarter wave plate 2201 between the reflecting surface 83 of the reflective optical element 82 and the xz cylinder lens 84.

In a preferred embodiment of an optical system as represented by FIGS. 22A and 22B, the coherent light source may be a laser, with power output at the first wavelength for example in the range of 100 mW-1 W depending on the required size of the projection image. In such a preferred embodiment, the xz cylinder lens 84 may have a focal length of +50 mm (for example, Thorlabs LJ1695RM), the xy cylinder lens 85 may have a focal length of −50 mm (for example, Thorlabs LK1336RM), and the compression cylinder lens 121 may have a focal length of +100 mm (for example, Thorlabs LJ1567L1). Other focal lengths may be selected depending on system parameters such as size of the container and absorption of the composition. In such a preferred embodiment, the quarter wave plate 2201 is selected to provide a quarter wave of retardance at the first wavelength (for example, Thorlabs WPQ05ME series), and the reflective optical element 82 is a planar mirror chosen to provide high reflectivity at the first wavelength (for example, Thorlabs BB series).

In methods and apparatuses for forming an object, a preferred optical image projection system to be used in conjunction with the optical system represented by FIGS. 22A and 22B, the illumination source may be a coherent light source consisting of a laser, with power output at the second wavelength for example in the range of 1 W-50 W depending on the required size of the projection image. In such a preferred optical image projection system, the spatial modulation of the projection image may be accomplished using a digital micromirror device (for example, a Texas Instruments DLP6500 digital micromirror device).

Figures 15A, 15B:
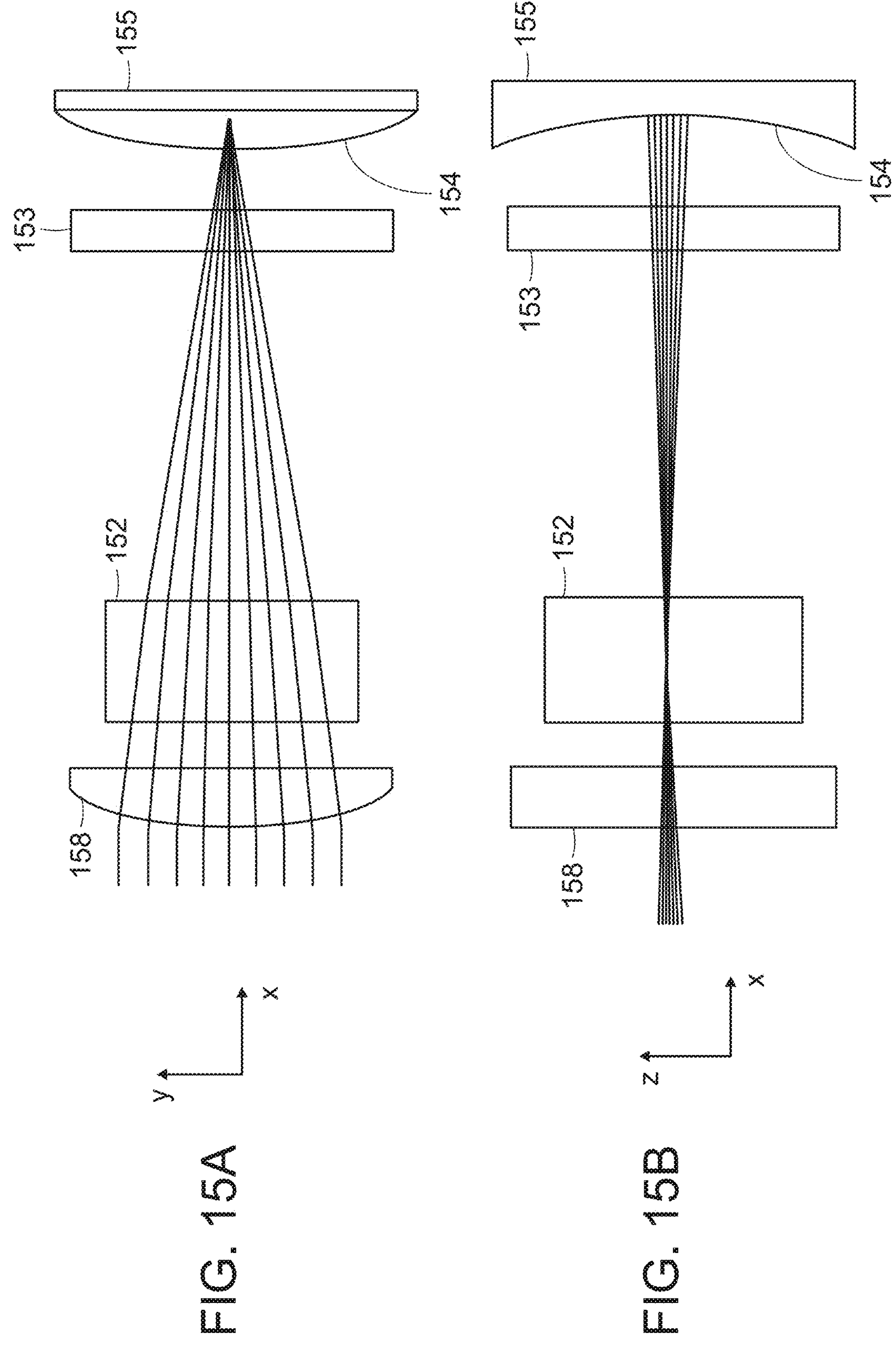
FIG. 15A depicts a diagram of a side view and FIG. 15B depicts a diagram of a top view of the same lens configuration for inclusion in an embodiment of the present invention.

FIG. 15A depicts a diagram of a side view and FIG. 15B depicts a diagram of a top view of an example of embodiments of a method and apparatus in accordance with the present invention including a light sheet generated with a coherent light source. The depicted example includes a reflective optical element 155 with a curved reflecting surface 154, such as a biconic mirror, on a side of the workspace 152 opposite the entry location of the light sheet into the workspace and compression cylinder lens 158 between the light sheet generating system (not shown) and the workspace (e.g., a container) 152 including a volume of a composition with nonzero absorption for the light sheet wavelength (e.g., a photohardenable composition)). The compression cylinder lens has curvature along the height (y) axis of the light sheet so that the height of the light sheet decreases with passage through the container. The depicted example further includes a quarter wave plate 153 positioned between the workspace 152 and the reflective optical element 155. FIGS. 15A and 15B show that for this example the focal point of the compression cylinder lens 158 at the curved reflecting surface 154 of the reflective optical element 155 so that the reflected light sheet ray path along the height (y) axis retraces or substantially retraces the path of the generated light sheet.

The methods and apparatuses of the present invention desirable for use with a coherent light source can preferably further include an optional linear polarizer.

Figure 16:
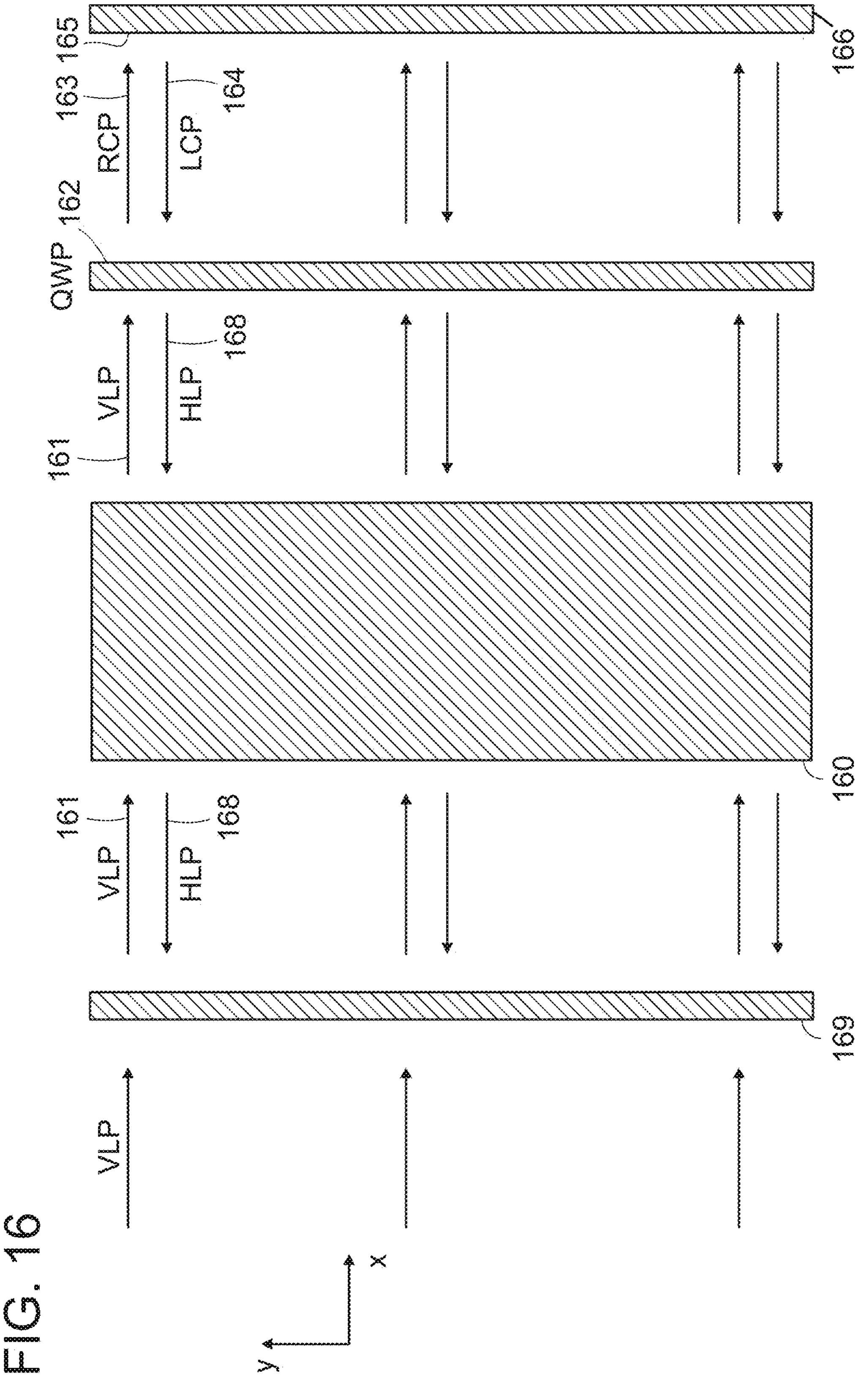
FIG. 16 depicts a diagram of a side view of an arrangement including a light sheet generating system, an optional vertical linear polarizer, a workspace (depicted as a container) including a volume of a composition, a quarter wave plate, and reflection optics (shown as a mirror) for inclusion in an embodiment of the present invention including polarization components.

FIG. 16 shows a diagram of the polarization of a light sheet generated with a coherent light source which produces linear polarization oriented along a first polarization axis 161 (for example, vertical linear polarization (VLP) as shown in the depicted example) and a reflected light sheet produced by an embodiment of an apparatus and method in accordance with the present invention that includes a quarter wave plate 162 between the workspace 160 including a volume of a composition included in a container and reflection optics 166 (e.g., comprising a mirror) and an optional linear polarizer 169 oriented along the first polarization axis on the opposite side of the workspace. As shown, the linear polarization axis of generated light sheet 161 is unchanged as it passes through the container 160. When it passes through the quarter wave plate 162 with polarization axis oriented at 45° to the first polarization axis, the polarization is shifted to generate circular polarization 163 (for example, right circular polarization (RCP)) and further phase shifted to circular polarization with opposite rotation (for example, left circular polarization (LCP)) 164 when reflected from the reflecting surface 165 of the reflective optical element 166. The circular polarization of the reflected light sheet is further phase-shifted to linear polarization having a polarization axis orthogonal (for example, horizontal linear polarization (HLP)) to the first polarization axis 168 by the quarter wave plate 162 and is reflected back through the container 160. If an optional linear polarizer component 169 oriented along the first polarization axis (for example, a vertical polarizer) is included on the opposite side of the container (e.g., between the container and the light sheet generating system (not shown), the reflected linearly polarized light sheet is prevented from passing into the light sheet generating system where it may cause instability of the source.

In other words, a light sheet generated from a laser source can have some degree of linear polarization. This polarization is preserved through the first pass through the container. To neutralize interference, the light sheet is preferably passed through a quarter wave plate (QWP), converting or phase-shifting the linear polarized light to circular polarized light. After reflection from the reflecting surface of the reflective optical element included in reflection optics, there is a 180° phase shift which converts the circular polarized light of one handedness to circular polarized light of the opposite handedness. After the reflected light sheet passes through the quarter wave plate, the circular polarized light is converted to linear polarized light with a polarization axis orthogonal to that of the generated light sheet. The reflected linear polarized light sheet enters the container for passing back therethrough. Because linear polarized light with orthogonal polarization axes cannot interfere, there is no interference between the generated and reflected light sheets.

In some cases, laser light reflecting back to the source can cause instability in the source. To prevent the second pass light from reaching the source, an optional linear polarizer with polarization axis along the axis of the generated light sheet (and thus orthogonal to the polarization axis of the reflected light sheet) can be placed in the beam path between the container and the optical system that produced the generated light sheet. This prevents passage of the reflected light back to the source without preventing passage of a generated light sheet on its first pass through the volume of composition included in the container.

Figure 17:
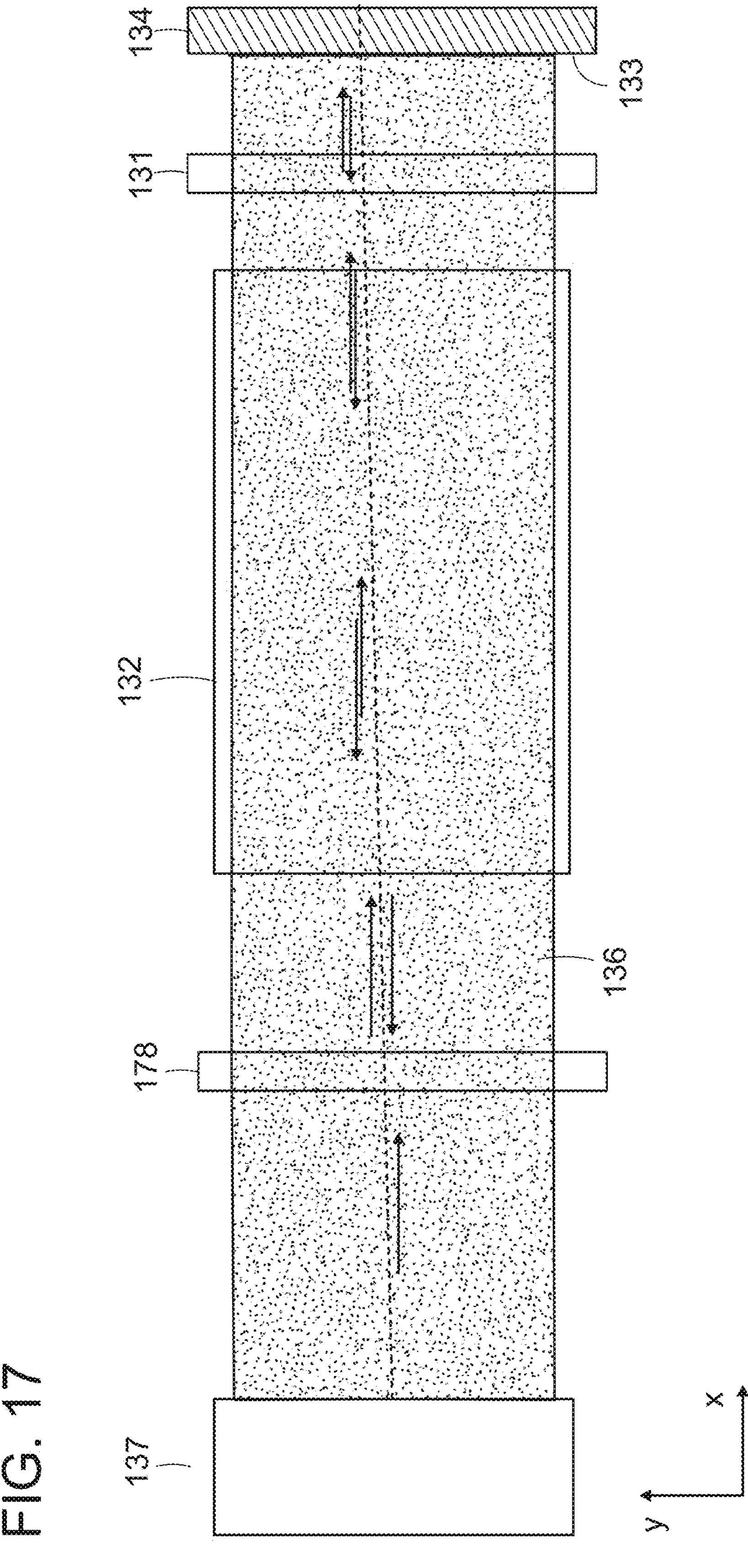
FIG. 17 depicts a diagram of a side view of an arrangement including a light sheet generating system, an optional vertical linear polarizer, a workspace including a volume of a composition, a quarter wave plate, and reflection optics for inclusion in an embodiment of the present invention.

FIG. 17 shows a side view of a diagram of an example of an arrangement including a light sheet generating system 137, an optional linear polarization component 178, a workspace 132 including a volume of a composition, a quarter wave plate 131, and reflection optics comprising a reflective optical element suitable for use in an embodiment of an apparatus and method in accordance with an embodiment of the present invention schematically shown in FIG. 16. As shown in FIG. 17, the apparatus includes a light sheet generating system 137 for generating and/or directing a light sheet 136 including first wavelength light through a workspace 132 configured to include a volume of a composition, e.g., a photohardenable composition and reflection optics comprising a reflective optical element 134 including a flat reflecting surface 133 positioned and configured to reflect the generated light sheet exiting the volume of the composition included the workspace back through the volume of the photohardenable composition. The depicted embodiment further includes a quarter wave plate 131, discussed above, between the workspace and the reflection optics. An optional linear polarization component (which may also be referred to as a linear polarizer) 178 positioned between the light sheet generating system and workspace is also shown.

In practice of the present invention, it is preferred to photopolymerize the composition at a range of selected positions within the workspace. It is further preferred that the position of the projection focal plane and the position of the light sheet are simultaneously coplanar and also coincident with the location within the workspace where photopolymerization is desired. This situation preferably includes independent motion of two of the three involved items: the projection focal plane, the light sheet, and the container containing the workspace. If moving the light sheet, then the light sheet generating system and the reflection optics must be moved in tandem.

Figure 18B:
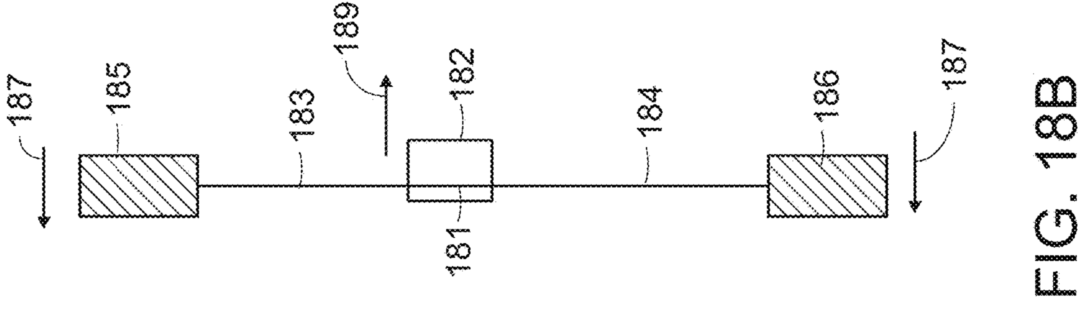
FIGS. 18A and 18B depict diagrams of a side view of an example of an embodiment of the present invention including translation of the light sheet axis relative to the volume of the container.
Figure 18A:
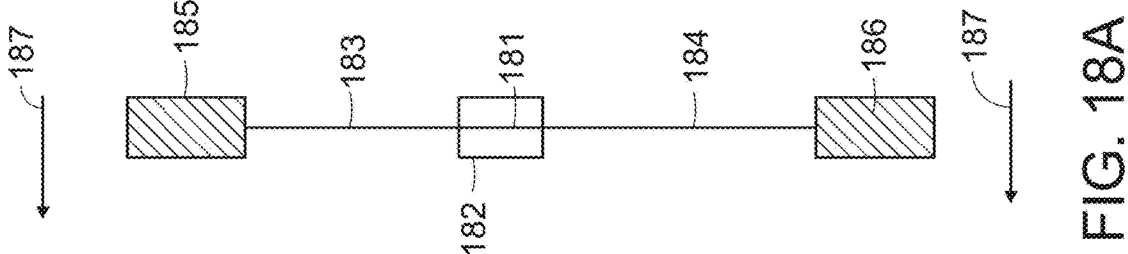

FIG. 18A depicts a combined light sheet 181 in the volume of the composition included in the workspace 182. Maintaining co-incidence of the path of the generated light sheet 183 and the path of the reflected light sheet 184, e.g., to overlap, is accomplished in this example by moving the light sheet generating system 185 and the reflection optics 186 in tandem (preferably in a synchronized manner) in the direction shown by arrow 187. In this example, the container 182 is translated in the opposite z direction 189 at the same time as shown in FIG. 18B.

Alternatively, the container including the composition can be moved to change the position of the combined lights sheets in the workspace without separate movement of components for directing the light sheets into the workspace.

Figure 19B:
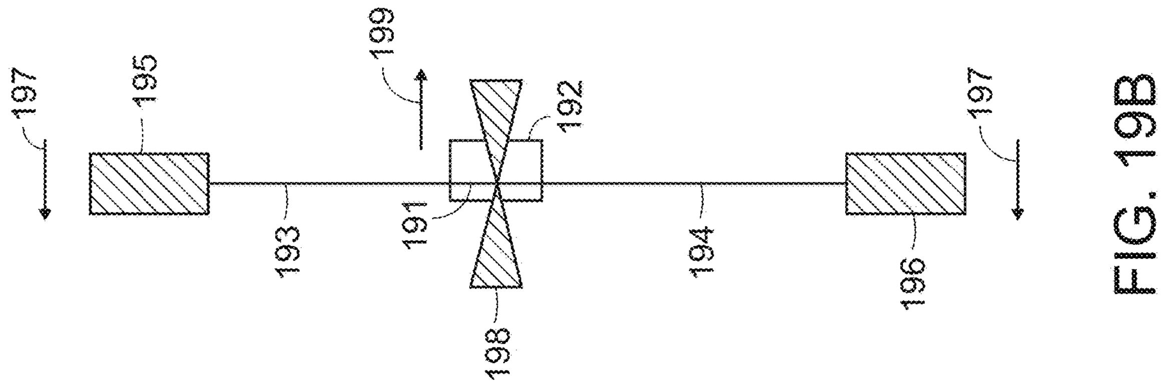
FIGS. 19A and 19B depict diagrams of a side view of an example of an embodiment of the present invention including projection of an optical image and further including translation of the light sheet axis relative to the volume of the container.
Figure 19A:
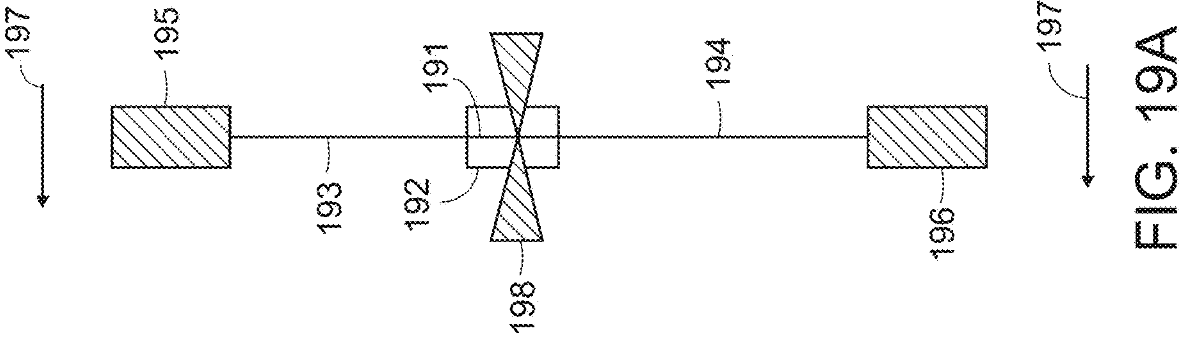

FIG. 19A depicts a combined light sheet 191 in embodiments of a method and apparatus for forming a three-dimensional object in a volume of a composition comprising a photohardenable composition included in a container 192.

Maintaining co-incidence of the path of the generated light sheet 193 and the path of the reflected light sheet 194, e.g., to overlap, is accomplished in this example by moving the light sheet generating system 195 and the reflection optics 196 in tandem (preferably in a synchronized manner) in the direction shown by arrow 197, as shown in FIG. 19A. In this example, the container is translated in the opposite z direction shown by arrow 199 at the same time as shown in FIG. 19B.

Alternatively, the projection focal plane and the container can be moved to change the location of the photopolymerization within volume of the photohardenable composition included in the workspace; in this case, the light sheet does not move (not shown). Alternatively, the projection focal plane and the light sheet (both generating system and reflection optics) can be moved to change the location of the photopolymerization within volume of the photohardenable composition in the workspace; in this case, the container does not move (not shown).

The projection 198 of the optical image into the volume to intersect with the combined light sheet is also shown in FIGS. 19A and 19B.

If the position of the combined light sheets is accomplished by moving the light sheet generating system, reflection optics, and/or other optical components that may be included in generating/directing and reflecting the light sheets (e.g., the vertical linear polarizer, quarter wave plate, other lenses or optical components on either side of the workspace in the path of the light sheet or reflected light sheet between the workspace), it is preferable for such movements to be synchronized to maintain the coplanarity of the coplanar light sheet in the volume.

As discussed above, reflection optics can comprise one or more components.

As discussed below, an optical system for generating a light sheet (also referred to herein as a light sheet generating system) typically can include a light source and one or more components.

The components included in either or both may be relatively large in size, have relatively large distance separation, be heavy, and/or have precise alignment requirements.

Because of any of these factors, mounting and/or translating the light sheet generating system and/or reflection optics may require precise positioning capability of the whole system and/or heavy-duty translation methods, adding to system size, weight, and cost. The requirements on translation and alignment can be reduced by using turn mirrors and/or a system of turn mirrors located in the optical path of the light sheet generating system and/or reflection optics.

If used, turn mirrors or mirror systems can be mounted on kinematic mounts to permit fine co-alignment between light sheet generating system and reflection optics.

Further, the turn mirrors or mirror systems (with or without kinematic mounts) can be mounted on a single translation stage, permitting a simple, low-cost method for translation in tandem.

Figures 20A, 20B, 21A, 21B:
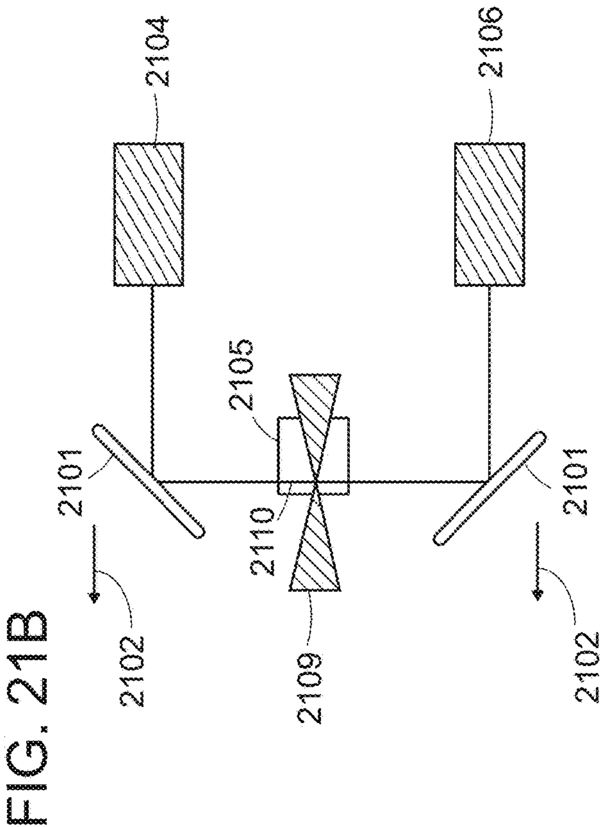
FIGS. 20A and 20B depict diagrams of a side view of an example of an embodiment of an apparatus in accordance with one aspect of the present invention including turn mirrors and further including translation of the light sheet axis relative to the volume of the container.
FIGS. 21A and 21B depict diagrams of a side view of an example of an embodiment of the present invention including projection of an optical image and turn mirrors and further including translation of the light sheet axis relative to the volume of the container.

FIGS. 20A and 20B depict a schematic diagram of embodiments of methods and apparatuses of the present invention that include mirrors or turn mirrors to vary the path of the generated light sheet from the light sheet generating system 2004 and the workspace 2005 and to vary the path of the reflected light sheet from the reflection optics 2006 and the workspace 2005. If the mirrors or mirror systems 2001 are moved in connection with moving the position of the combined light sheet 2010, it is preferable for such movements to be synchronized to maintain the coplanarity of the coplanar light sheet in the volume 2005. In FIG. 20B, the arrows 2002 show the direction that the mirrors 2001 are preferably translated in tandem to move the combined light sheet 2010 through the workspace 2005.

FIGS. 21A and 21B depict embodiments of methods and apparatuses for forming three-dimensional objects of the present invention that include mirrors or turn mirrors to vary the path of the generated light sheet from the light sheet generating system 2104 and the workspace 2105 and to vary the path of the reflected light sheet from the reflection optics 2106 and the workspace 2105. As mentioned above, if the mirrors or mirror systems 2101 are moved in connection with moving the position of the combined light sheet 2110, it is preferable for such movements to be synchronized to maintain the coplanarity of the coplanar light sheet in the volume. In FIG. 21B, the arrows 2102 show the direction that the mirrors 2101 are preferably translated in tandem to move the combined light sheet 2110 through the workspace 2105. The projection 2109 of the optical image into the volume to intersect with the combined light sheet is also shown.

With use of turn mirrors or mirror systems, the optical path length between light sheet generating system and the workspace, and between reflection optics and the workspace, can vary during translation. This may or may not be acceptable, depending on the numerical aperture of the light sheet and the function of the light sheet.

In methods and apparatuses in accordance one or more aspects and/or embodiments of the present invention, a light sheet can be generated by a light sheet generating system. Light sheet generating systems and techniques are known. Examples of known line generators typically can include optics (e.g., Powell lens, diffractive optic, cylindrical lenses, other collimating optics, etc.) to form a beam in combination with one or more lenses (e.g., cylindrical lenses) and/or optionally one or more components or devices, e.g., scanner, including but not limited to polygon scanner, galvanometer scanner, MEMS scanner, piezo-electric scanner, acousto-optic scanner, a light guide plate (with a fiber light source if used), a spatial light modulator, including but not limited to digital micromirror device (DMD) and Liquid Crystal on Silicon (LCOS) panel that can generate a line-shaped beam which is projected across a planar slice of a volume or space creating a sheet of light along the projection axis through the volume or space.

Preferably the light sheet generating system includes a first light source, a line generator, and optics to focus the width of the light sheet such that the beam waist is at the center of the container. Focus optics can optionally include zoom optics to be able to adjust the location of the beam waist to accommodate different container sizes or to be able to adjust the light sheet width profile through the workspace.

A light sheet can be generated from a coherent light source (such as a laser) or an incoherent light source (such as a light emitting diode (LED)). A sheet of light can also be generated with an extended light source (e.g., a one-dimensional array of lasers or LEDs) that can further include other optical components.

Other exemplary light sheet generating systems and other related information that may be useful in methods and apparatuses in accordance with one or more aspects and/or embodiments of the present invention are discussed in International Application No. PCT/US2022/039766 of Quadratic 3D, Inc. filed Aug. 9, 2022 for "Methods And Systems For Forming An Object In A Volume Of A Photohardenable Composition", which application is hereby incorporated herein by reference in its entirety.

In methods and apparatuses for forming an object in accordance one or more aspects and/or embodiments of the present invention, an optical image can include any optical projection generated by an optical projection system. Examples of optical images include, without limitation, a two-dimensional image, a patterned or unpatterned image, a patterned or unpatterned two-dimensional image, a line of light, or a single point of light. A two-dimensional image can comprise a cross-sectional plane of the three-dimensional image being printed. While an optical image may be described as a two-dimensional image, a two-dimensional image can represent a cross-sectional slice of an object to be printed. Such cross-sectional slice is typically generated using slicing software, as discussed elsewhere herein. When projected by excitation light, a two-dimensional optical image may comprise opposed major surfaces and have a thickness dimension perpendicular to the opposed major faces of the two-dimensional image.

In methods and apparatuses in accordance one or more aspects and/or embodiments of the present invention, unless otherwise specified, any lens or mirror surface can be spherical or aspherical.

In describing lenses and the curvature of a lens surface, there are several terms of art with a basis in mathematics that are typically used as follows:

Biconic (most general): same or different spherical or aspherical curvatures specified along two orthogonal axes.

Toroidal: a biconic surface in which the first curvature may be spherical or aspherical, but the second curvature must be spherical Cylindrical ("cylindrical lens" "cylinder lens"): a toroidal surface in which the second curvature is infinite Aspherical: ("asphere") a toroidal surface in which the first and second curvatures are identical and aspherical.

Spherical ("standard lens"): a toroidal surface in which the first and second curvatures are identical and spherical.

Positive lenses can include any combination of convex and/or concave lens surface curvatures such that the lens has positive focusing power.

Negative lenses can include any combination of convex and/or concave lens surface curvatures such that the lens has negative focusing power.

In embodiments of the present invention relating to forming an object, a composition preferably comprises a photohardenable composition. Examples of photohardenable compositions comprise a photohardenable component. A photohardenable composition can further include a photoinitiator. A photohardenable composition can further include one or more other additives depending upon the desired end use. Examples of typical additives include, but are not limited to, a thixotrope/rheology modifier, a defoamer, a stabilizer, an oxygen scavenger, and a non-reactive solvent diluent. Any additive can be a single additive or a mixture of additives. For example, a thixotrope can comprise a single thixotrope or a mixture of two or more thixotropes. Additives are preferably selected so that they do not react with the photohardenable component or any photoinitiator or other additive that may be included in photohardenable compositions. A photohardenable composition can optionally include one or more coinitiators and/or sensitizers.

A photohardenable component suitable for use in a photohardenable composition includes any resin (e.g., a monomer, an oligomer, a pre-polymer, a polymer, or a mixture including at least one the foregoing) that is photohardenable by exposure to light in the presence of a photoinitiator. Examples of photohardenable components useful in a photohardenable composition include ethylenically unsaturated compounds and, more specifically, a polyethylenically unsaturated compounds. These compounds include both monomers having one or more ethylenically unsaturated groups, such as vinyl or allyl groups, and polymers having terminal or pendant ethylenic unsaturation. Such compounds are well known in the art and include acrylic and methacrylic esters of polyhydric alcohols such as trimethylolpropane, pentaerythritol, and the like; and acrylate or methacrylate terminated epoxy resins, acrylate or methacrylate terminated polyesters, etc. Representative examples include, but are not limited to, ethylene glycol diacrylate, ethylene glycol dimethacrylate, trimethylolpropane triacrylate (TMPTA), pentaerythritol tetraacrylate, pentaerythritol tetramethacrylate, dipentaerythritol hydroxypentacrylate (DPHPA), hexanediol-1,6-dimethacrylate, and diethyleneglycol dimethacrylate. Preferred examples include, but are not limited to, a urethane acrylate or a urethane methacrylate.

A photohardenable component can optionally comprise one or more multifunctional acrylate monomers. Dipentaerythritol pentaacrylate, a pentafunctional acrylic monomer available from Sartomer as SR399 is an example of a photohardenable resin component that may be desirable for inclusion in photohardenable composition of the present invention.

Aliphatic urethane acrylates may also be desirable for use as a photohardenable resin component for inclusion in a photohardenable composition described herein.

Mixtures of multifunctional acrylate monomers, such as dipentaerythritol pentaacrylate (e.g., SR399 from Sartomer), and aliphatic urethane acrylates can also be used.

A photohardenable component including other mixtures including one or more resin components can also be desirable.

Preferably, the photohardenable component included in the photohardenable composition is selected to achieve an optically transparent medium, which is desirable in processes and systems in which light, e.g., excitation light, is directed into the composition or light.

Examples of particularly preferred photohardenable components include, but are not limited to, free-radical-polymerizable resins, cross-linkable resins, multifunctional acrylate monomers, methacrylates, aliphatic urethane acrylates, and the like.

Optionally a solvent, preferably, for example, but not limited to, an acrylamide monomer or an acrylate monomer, can be further included in a photohardenable composition for mixing the photoinitiator in the photohardenable resin component. Other suitable solvents may also be used.

A photoinitiator for inclusion in a photohardenable composition can be selected by one of ordinary skill the art taking into account its suitability for the mechanism to be used to initiate hardening (e.g., polymerization, cross-linking, curing, etc.) as well as its suitability for and/or compatibility with the hardenable resin component and other components of the photohardenable composition. Selection of a photoinitiator can also take into consideration the absorption band of the photoinitiator and the wavelength(s) of the radiation or light that will be used to activate the photoinitiator so that there is a match or at least an overlap between the two. By way of non-limiting examples, photoinitiators are available that can be activated by UV or visible wavelength light. Other factors, e.g., absorption coefficients, rate constants of the primary radicals toward the hardenable resin component, possible side reactions, light intensity can also be taken into consideration and balanced in the selection process. See, for example, A, Eibel, et al., "Choosing the ideal photoinitiator for free radical photopolymerizations: predictions based on simulations using established data", Polym. Chem., 2018, 9, 5107-5115.

A photoinitiator can comprise a single photoinitiator or a combination of photoinitiators or a photoinitiator system including two or more components, at least one of which is a photoinitiator.

Preferred photoinitiators for inclusion in a photohardenable composition for use in forming an object in a volume include photoswitchable photoinitiators (which may also be referred to as dual-color photoinitiators) which convert from an inactive (non-initiating) form via excitation light of a first wavelength into an active (initiating) form, wherein subsequent or simultaneous excitation light of a second wavelength absorbed by the active form induce hardening of the photohardenable composition (e.g., via a crosslinking or polymerization reaction in the photohardenable component), wherein the first and second wavelengths are different.

The conversion of the photoswitchable photoinitiators to a second form of the molecule (e.g., an isomer thereof, e.g., for a photochromic molecule having a closed ring structure to a second from which is an open ring form thereof) is preferably a reversible photochemical structural change.

Several considerations in selecting a particular photoswitchable photoinitiator for inclusion in a photohardenable composition include, by way of example, but not limited to, the absorption spectra and Δmax of the molecule and its second forms, the solubility of the photoswitchable photoinitiator in the photohardenable resin component, the photosensitivity of the second form of the photoswitchable photoinitiator, the amount of initial concentration of the second form in the monomer solution, the stability of the photoswitchable photoinitiator and the reduction and oxidation potentials of the second form of the photoswitchable photoinitiator.

Photoswitchable photoinitiators are particularly preferred for use in forming objects use in the methods of the present invention for forming three-dimensional objects because the photoswitchable photoinitiator molecule in its closed form and the photoinitiator molecule in its activated second form (e.g., the open form) have sufficiently distinct absorption spectra that once the closed form of the molecule is converted to its open form, the open form absorbs in a wavelength region where the closed form is substantially non-absorbing. In this way, the open form can be independently excited with the second wavelength without causing unintended excitation of the closed form by the second wavelength. The second wavelength can excite the open form to generate free radicals or otherwise induce desired hardening of the photohardenable resin component once the open form has been generated by exposure to the first wavelength.

A photoswitchable photoinitiator can comprise a photochromic dye. The dual-color photoinitiator preferably spontaneously reverts from active form to inactive form via thermal energy at the ambient temperature (T-type photochromism). Various types of T-type photochromic dyes are known to those skilled in the art, including but not limited to spiropyrans. These dyes function by light activated ring opening to form a merocyanine dye (active form). The active form may subsequently absorb light of a different wavelength to form an excited state of the active form which may subsequently induce photoinitiation, either alone or in combination with a coinitiator or synergist (e.g., amine, thiol, organoborate compounds). Properties important for the selection of a photoswitchable photoinitiator include absorbance spectra for the inactive and active forms; switching rates for the transitions between both forms; and equilibrium concentration of both forms; and intersystem crossing yield of the excited state of the active form. High intersystem crossing yield of the excited state of the active form is beneficial for producing long-lived triplet excited states which may interact via electron, proton, or energy transfer with a syngerist to induce photoinitiation. Examples of suitable dual-color photoinitiators include, but are not limited to, 1'-benzyl-3',3'-dimethyl-8-iodo-7-methoxy-6-nitrobenzospiropyran, 1'-benzyl-3',3'-dimethyl-8-(4-benzoylphenyl)-7-methoxy-6--phenylene))bis(9H-thioxanthen-9-one). Selection of second excitation light for generating an optical image for use with a photohardenable composition takes into consideration the absorption spectrum of the photoswitchable photoinitiator included in the composition. For example, a second excitation light including red or green light can be used with a photohardenable composition including either of above examples 1'-benzyl-3',3'-dimethyl-8-iodo-7-methoxy-6-nitrobenzospiropyran and 1'-benzyl-3',3'-dimethyl-8-(4-benzoylphenyl)-7-methoxy-6-nitrobenzospiropyran; a second excitation light including green light is preferably used with a photohardenable composition including above example 2,2'-((6-methoxy-4-phenyl-2H-benzo[h]chromene-2,2-diyl)bis(4,1-phenylene))bis(9H-thioxanthen-9-one).

Additional examples of photoswitchable photoinitiators, photohardenable components, and other optional additives suitable for inclusion in a photohardenable composition are described in International Patent Application PCT/US2022/037491, filed Jul. 18, 2022, of Quadratic 3D, Inc., International Patent Application PCT/US2022/042179, filed Aug. 31, 2022, of Quadratic 3D, Inc., International Patent Application PCT/US2022/042183, filed Aug. 31, 2022, of Quadratic 3D, Inc. International Patent Application PCT/US2022/042186, filed Aug. 31, 2022, of Quadratic 3D, Inc.

Optionally, the photohardenable composition can further include a coinitiator and/or a sensitizer. A sensitizer can create the excited state of the photoswitchable photoinitiator via absorbing light and transferring energy to the photoswitchable photoinitiator. A coinitiator, in combination with the photoinitiator, can facilitate photoinitiation by the photoswitchable photoinitiator active form via, e.g., electron transfer or proton transfer.

A coinitiator (also referred to as a synergist) can comprise, e.g., an amine (e.g., tertiary amine), a thiol, a thioether, a mercaptan, a silane, an organoborate compound, a diaryliodonium salt, a triarylsulfonium salt. Iodonium salts may also be useful, particularly in combination with a borate salt. In certain embodiments, an iodonium salt may also be included in combination with a tertiary amine. Examples of other useful electron donating coinitiators are discussed by Eaton, D. F., "Dye Sensitized Photopolymerization", Advances in Photochemistry, Vol. 13, pp 427-486. A preferred example of a suitable synergist is butyryl choline butyltriphenylborate.

A photohardenable composition may further include additional additives. Examples of such additives include, but are not limited to, thixotropes, oxygen scavengers, etc.

In the methods and apparatuses described herein for forming an object, preferably the photohardenable composition included in the container displays non-Newtonian rheological behavior. Non-Newtonian rheological behavior can facilitate forming an object in the volume without support structures and with minimal displaced of the object in the volume of the photohardenable composition during formation. Non-Newtonian behavior of the photohardenable composition can additionally simplify separation of the object from the volume of the photohardenable composition in which it is formed or printed. Examples of non-Newtonian rheological behavior include but are not limited to pseudoplastic fluid, yield pseudoplastic, or Bingham plastic.

In methods and apparatuses in accordance with the present invention, the selection of wavelength(s) of the excitation light for the excitation light projections is preferably made taking into account the photohardenable composition and hardening mechanism being used.

For example, for photohardenable compositions that are hardenable via a hardening mechanism that involves a single wavelength of excitation light, the wavelength of the excitation light projection(s) can be the same. Optionally in such case, an excitation light projection including a different wavelength light can also be included, for example for inhibiting undesired hardening of the photohardenable composition.

In cases where a photohardenable composition is hardenable via a hardening mechanism that involves more than one wavelength of excitation light, the wavelengths of the excitation light projections will be selected for projecting excitation light with appropriate wavelengths for the hardening mechanism. Optionally a third wavelength light can also be used to inhibit undesired hardening of the photohardenable composition.

The first and second wavelengths can be in the ultraviolet, visible, or near-infrared range. Preferably the first wavelength is in the ultraviolet range and the second wavelength is in the visible range.

Examples of photoswitchable photoinitiators useful in photopolymerizable liquids can absorb at about 300 to 450 nm. Depending upon the absorption spectrum for the particular photoswitchable photoinitiator, the conversion to the second form can be induced by exposure to any source which emits in this range, e.g., lasers, light emitting diodes, mercury lamps. Filters may be used to limit the output wavelengths. A non-limiting example of filtered light includes filtered emission from a mercury arc lamp, etc. The second form of the photoswitchable photoinitiator will preferably absorb in a range of about 450 to 1000 nm and 450 to 850 most typically.

Additional information that may be useful in connection with the methods and apparatuses of the present invention include U.S. Patent Application No. 63/223,112 of Quadratic 3D, Inc. filed Jul. 19, 2021 for "Photohardenable Compositions, Methods For Forming An Object In A Volume Of A Photohardenable Composition, And Products Thereof", U.S. Patent Application No. 63/226,605 of Quadratic 3D, Inc. filed Jul. 28, 2021 for "Photohardenable Compositions, Methods For Forming An Object In A Volume Of A Photohardenable Composition, And Products Thereof", International Application No. PCT/US2022/039766 of Quadratic 3D, Inc. filed Aug. 9, 2022 for "Methods And Systems For Forming An Object In A Volume Of A Photohardenable Composition", U.S. Pat. No. 10,843,410 of Lippert, et al. for "System And Method For A Three-Dimensional Optical Switch Display (OSD) Device", U.S. Pat. No. 5,230,986 of Neckers, and U.S. Pat. Nos. 4,041,476, 4,078,229, 4,238,840, 4,466,080, 4,471,470, and 4,333,165 to Swainson, each of the foregoing being hereby incorporated herein by reference in its entirety.

Optionally, depending upon the oxygen sensitivity of the photohardenable composition being used, the photohardenable composition can be purged or sparged with an inert gas before being introduced into the workspace. In such case, it may also be desirable to maintain an oxygen sensitive photohardenable composition in an inert atmosphere during printing.

The apparatuses and methods of the present invention may be particularly useful in or with other 3D printing techniques that include initiation of a photochemical reaction in a photoreactive system via the absorption of light energy supplied by one or more excitation light projections to form an object. Examples include tomographic printing, two-photon printing, upconversion printing, and dual-wavelength printing.

Before forming an object or "printing", a digital file of the object to be printed is obtained. If the digital file is not of a format that can be used to print the object, the digital file is then converted to a format that can be used to print the object. An example of a typical format that can be used for printing is an STL file. Typically, the STL file is then sliced into two-dimensional layers with use of three-dimensional slicer software and converted into G-Code or a set of machine commands, which facilitates building the object. See B. Redwood, et al., "The 3D Printing Handbook—Technologies, designs applications", 3D HUBS B.V. 2018.

When used as a characteristic of a portion of a container or build chamber, "optically transparent" refers to having high optical transmission to the wavelength of light being used, and "optically flat" refers to being non-distorting (e.g., optical wavefronts entering the portion of the container or build chamber remain largely unaffected).

As used herein, "compression lens" refers to a lens, for example a cylinder lens, acting to compress or reduce the height (e.g., y dimension) of the light sheet as a function of distance through the container (e.g., x dimension).

As used herein, the singular forms "a", "an" and "the" include plural unless the context clearly dictates otherwise. Thus, for example, reference to an emissive material includes reference to one or more of such materials.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of forming an object in a volume of a composition comprising a photohardenable composition, the method comprising:

(a) forming a combined light sheet including a first wavelength at a selected location in the volume of the composition comprising directing a generated light sheet along a light sheet illumination axis at the selected location through the volume of the composition; and reflecting the light sheet exiting the volume of the composition back through the volume of the composition;

(b) projecting an optical image including a second wavelength into the volume of the composition to intersect with the combined light sheet at the selected location in the volume, the optical image being projected into the volume along a projection axis perpendicular to the light sheet illumination axis, the projected optical image being perpendicular to its projection axis and the combined sheet being orthogonal to the direction in which the optical image is projected into the volume, wherein the composition comprising the photohardenable composition is at least partially hardened at the intersection of the optical image and the combined light sheet; and (c) optionally repeating steps (a) and (b) until the object is partially or fully formed, wherein the intersection occurs at the same or a different selected location in the volume.

2. The method of claim 1 wherein the combination of the generated light sheet and the reflected light sheet improves uniformity of light sheet intensity along the light sheet illumination axis through the volume of the composition.

3. The method of claim 1 wherein the method further comprises generating the light sheet from a beam of light from a coherent or incoherent light source.

4. The method of claim 1 wherein the first wavelength and second wavelength are different.

5. The method of claim 1 wherein reflecting the light sheet comprises reflecting the light sheet with reflection optics including a reflective optical element.

6. The method of claim 5 wherein the reflection optics further include one or more lenses and/or other optical elements.

7. The method of claim 6 wherein the one or more optical elements include an xz cylinder lens comprising a positive cylinder lens with curvature along the width (z) axis and curvature chosen such that the reflected light sheet rays retrace or substantially retrace the path of the generated light sheet rays along the width (z) axis, wherein the xz cylinder lens is positioned between the volume of the composition and the reflective optical element.

8. The method of claim 6 wherein the one or more optical elements include an xy cylinder lens comprising a negative cylinder lens with curvature along the height (y) axis and curvature chosen such that the reflected light sheet rays retrace or substantially retrace the path of the generated light sheet rays along the height (y) axis, wherein the xy cylinder lens is positioned between the volume of the composition and the reflective optical element.

9. The method of claim 6 wherein the one or more optical elements include an xz cylinder lens comprising a positive cylinder lens with curvature along the width (z) axis and curvature chosen such that the reflected light sheet rays retrace or substantially retrace the path of the generated light sheet rays along the width (z) axis, and an xy cylinder lens comprising a negative cylinder lens with curvature along the height (y) axis and curvature chosen such that the reflected light sheet rays retrace or substantially retrace the path of the generated light sheet rays along the height (y) axis.

10. The method of claim 9 wherein the xy cylinder lens is positioned between the volume of the composition and the xz cylinder lens.

11. The method of claim 9 wherein a compression cylinder lens comprising a positive cylinder lens is included in the path of the generated light sheet before it passes into the volume of the composition and the method further comprises passing the generated light sheet through the compression cylinder lens before it passes into the volume of the composition.

12. The method of claim 11 wherein the xy cylinder lens has an xy cylinder lens focal length and the compression cylinder lens has a positive cylinder lens focal length, and wherein each of the xy cylinder lens and compression cylinder lens focal lengths is co-selected such that light rays included in the generated light sheet and the light rays included in the reflected light sheet proceed along a path that is the same or substantially the same path within the volume of the composition.

13. The method of claim 6 wherein a compression cylinder lens comprising a positive cylinder lens is included in the path of the generated light sheet before it passes into the volume of the composition and the method further comprises passing the generated light sheet through the compression cylinder lens before it passes into the volume of the composition.

14. The method of claim 13 wherein the method further comprises generating the light sheet from a light beam from an incoherent light source, wherein an xz cylinder lens is positioned between the volume of the composition and the reflective optical element, and wherein the reflective optical element comprises a flat mirror.

15. The method of claim 13 wherein the method further comprises generating the light sheet from a light beam from a coherent light source, wherein an xz cylinder lens is positioned between the volume of the composition and the reflective optical element, and wherein the reflective optical element comprises a flat mirror.

16. The method of claim 6 wherein the one or more optical elements include a biconic lens, the biconic lens being positioned between the volume of the composition and the reflective optical element.

17. The method of claim 5 wherein the reflective optical element comprises a flat mirror.

18. The method of claim 5 wherein the reflective optical element comprises a curved mirror.

19. The method of claim 18 wherein a compression cylinder lens comprising a positive cylinder lens is included in the path of the generated light sheet before it passes into the volume of the composition and the method further comprises passing the generated light sheet through the compression cylinder lens before it passes into the volume.

20. The method of claim 5 wherein the reflective optical element comprises a biconic mirror.

21. The method of claim 5 wherein the reflection optics further include a zoom optical system, the zoom optical system being positioned between the volume and the reflective optical element.

22. The method of claim 1 wherein the method further comprises generating the light sheet from a light beam from a coherent light source, and the method further includes phase shifting the generated light sheet exiting the volume and phase shifting the reflected light sheet before passing back through the volume along the projection axis such that interference generated between the generated light sheet and the reflected light sheet is neutralized.

23. The method of claim 22 wherein generating the light sheet further comprises passing the light beam through a compression cylinder lens comprising a positive cylinder lens positioned between the coherent light source and the volume to adjust the height profile of the light sheet.

24. The method of claim 22 further including passing the reflected light sheet exiting the volume of the composition through a linear polarizer to block further passage of the reflected light sheet.

25. The method of claim 22 wherein phase shifting the generated light sheet exiting the volume and phase shifting the reflected light sheet before passing back through the volume along the projection axis such that interference generated between the generated light sheet and the reflected light sheet is neutralized comprises passing the generated light sheet exiting the volume and the reflected light sheet before entering the volume through a quarter-wave-plate positioned between the reflecting surface of the reflective optical element and the volume of the composition with the major surfaces of the quarter-wave plate being normal to the illumination axis and the fast or slow axis of the quarter wave plate being at an angle of 45 degrees relative to the linear polarization axis of the source.

26. The method of claim 1 wherein the generated light sheet and reflected light sheet are directed into the volume of the composition to be coplanar.

27. The method of claim 26 further comprising moving the coplanar light sheets to one or more different selected locations in the volume including synchronized movement of a light sheet generating system used to generate the generated light sheet and the reflection optics to maintain the coplanarity of the coplanar light sheet in the volume while moving the volume of the composition or the focal point of the projection.

28. The method of claim 1 wherein the photohardenable composition comprises a photohardenable component and a photoinitiator or photoinitiator system.

29. The method of claim 28 wherein the photoinitiator system comprises a photoswitchable photoinitiator that is activatable by exposure to light having a first wavelength and light having a second wavelength to induce a crosslinking or polymerization reaction in the photohardenable component.

* * * * *